United States Patent
Inden et al.

[11] Patent Number: 5,823,507
[45] Date of Patent: Oct. 20, 1998

[54] PRESSURE CONTROL APPARATUS

[75] Inventors: Masahiro Inden; Yoshiyuki Katoh; Akihiko Sugiura, all of Aichi, Japan

[73] Assignee: Aisin Seiki Kabushiki Kaisha, Kariya, Japan

[21] Appl. No.: 741,364

[22] Filed: Oct. 30, 1996

[30] Foreign Application Priority Data

Oct. 31, 1995 [JP] Japan ................................. 7-283963

[51] Int. Cl.⁶ .................................................. F16K 31/02
[52] U.S. Cl. ................................. 251/129.15; 303/119.2
[58] Field of Search .................... 251/129.15, 129.01; 303/119.2; 137/560, 884

[56] References Cited

U.S. PATENT DOCUMENTS

| | | | |
|---|---|---|---|
| 4,929,038 | 5/1990 | Reinartz | 303/119.2 |
| 5,040,853 | 8/1991 | Burgdorf et al. | 303/119.2 |
| 5,127,440 | 7/1992 | Maas et al. | 303/119.2 |
| 5,141,298 | 8/1992 | Von Hayn et al. | 303/119.2 |
| 5,275,478 | 1/1994 | Schmitt et al. | 251/129.15 |
| 5,385,396 | 1/1995 | Beck et al. | 303/119.2 |
| 5,386,337 | 1/1995 | Schoettl | 303/119.2 |
| 5,449,227 | 9/1995 | Steinberg et al. | 251/129.15 |
| 5,462,344 | 10/1995 | Jakob et al. | |
| 5,662,392 | 9/1997 | Hinz | |

FOREIGN PATENT DOCUMENTS 43 06 769  9/1994  Germany.
43 30 827  3/1995  Germany.

*Primary Examiner*—Denise L. Ferensic
*Assistant Examiner*—John Ball
*Attorney, Agent, or Firm*—Burns, Doane, Swecker & Mathis, LLP

[57] ABSTRACT

A bobbin 7 around which a solenoid 6 is wound is connected to an electronic control unit 1 fixed to a base plate portion 3c through a connection terminal 11 penetrating a connection hole 2 and a guide hole 4 whose one end portion is fixed to a bobbin 7 and is connected to an end portion of a solenoid 6 and other end portion is connected to the connection hole 2, a hook portion 3d is engaged into a hole 10b so that a yoke 8 is supported, an electromagnetic-force generating portion 5 is assembled to a casing 3, gaps 18 and 21 are formed between the yoke 8 and the bobbin 7 so that the yoke 8 is made to be movable with respect to the bobbin 7 in the axial direction of the sleeve 13 and also in a direction perpendicular to the axial direction of the sleeve 13. When the casing 3 and the valve housing 14 are assembled, the sleeve 13 is smoothly inserted into the electromagnetic-force generating portion 5, and the yoke 8 is pressed and urged to the valve housing 14 by a ring spring 12.

13 Claims, 8 Drawing Sheets

PRESSURE CONTROL APPARATUS

BACKGROUND OF THE INVENTION

1. Field of the Invention

The present invention relates to a pressure control apparatus integrally provided with an electronic control unit.

2. Description of the Related Art

As a conventional pressure control apparatus integrally provided with an electronic control unit, a pressure control apparatus disclosed in WO92/12878 has been known. The pressure control apparatus disclosed is WO92/12878 includes an electronic control unit, an electromagnetic-force generating portion consisting of a solenoid electrically connected to the electronic control unit, a bobbin around which the solenoid is wound and a yoke secured to the bobbin, surrounding at least two ends of the bobbin and a surface around which the solenoid is wound and forming a magnetic flux passage, a valve housing accommodating a movable plunder which is operated when the solenoid is supplied with electric power and having a sleeve which is inserted into the yoke and the bobbin, and a casing secured to the valve housing and covering the electronic control unit, the electromagnetic-force generating portion and the sleeve, wherein the casing has a base plate portion which divides the inside portion of the casing in a direction perpendicular to the axial direction of the sleeve into a chamber in which the electronic control unit is disposed and a chamber in which the electromagnetic-force generating portion is disposed and to an end of which the electronic control unit is secured, the electronic control unit has a connection hole, the base plate portion has a guide hole at a position opposite to the connection hole, the electronic control unit and the electromagnetic-force generating portion are connected to each other by electrically connecting an end of the wound solenoid to the connection hole through the guide hole, and an electromagnetic-force generating portion support member made of an elastic material for supporting the electromagnetic-force generating portion is formed at another end of the base plate portion.

The above-mentioned pressure control apparatus has such a structure that the electromagnetic-force generating portion is assembled to the electronic control unit by connecting the end of the solenoid to the connection hole through the guide hole, the electromagnetic-force generating portion is, by the electromagnetic-force generating portion support member, supported on the base plate portion, that is, on the casing, and then the casing having the electronic control unit and the electromagnetic-force generating portion is assembled to the valve housing so that the sleeve is inserted into the bobbin and the yoke, that is, the electromagnetic-force generating portion, the electromagnetic-force generating portion is brought into contract with the valve housing so as to be pressed, the electromagnetic-force generating portion support member is elastically deformed so that the electromagnetic-force generating portion is pushed upwards in the axial direction of the sleeve, and the restoration force of the electromagnetic-force generating portion support member presses and urges the electromagnetic-force generating portion toward the valve housing.

If a somewhat positional deviation takes place between the electromagnetic-force generating portion and the sleeve, that is, the sleeve insertion hole of the yoke and the bobbin and the sleeve when the casing having the electronic control unit and the electromagnetic-force generating portion is assembled to the valve housing, the electromagnetic-force generating portion support member made of the elastic material is elastically deformed so that the positional deviation is absorbed. As a result, the electromagnetic-force generating portion and the sleeve can smoothly be assembled.

Since the electromagnetic-force generating portion is pressed and urged by the electromagnetic-force generating portion support member toward the valve housing, the position of the electromagnetic-force generating portion can be maintained. Therefore, looseness of the electromagnetic-force generating portion can be prevented.

However, the above-mentioned pressure control apparatus including the electromagnetic-force generating portion support member made of the elastic material involves a necessity that a flexible member, such as an end of the wound solenoid, is used to establish the connection between the electronic control unit and the electromagnetic-force generating portion. The reason for this is that the effect of the electromagnetic-force generating portion support member made of the elastic material cannot be obtained if the connection between the electronic control unit and the electromagnetic-force generating portion is established by, for example, a metal connection terminal. That is, in the case where the electromagnetic-force generating portion is brought into contact with the valve housing and thus the same is pressed when the casing provided with the electronic control unit and the electromagnetic-force generating portion is assembled to the valve housing, the electromagnetic-force generating portion cannot be pushed upwards in the axial direction of the sleeve by elastically deforming the electromagnetic-force generating portion support member because of the state where the electromagnetic-force generating portion is secured to the electronic control unit through the metal connection terminal. In a case where somewhat deviation takes place between the sleeve insertion holes of the yoke and the bobbin and the sleeve, the electromagnetic-force generating portion support member made of the elastic material cannot be elastically deformed. As a result, the positional deviation cannot be absorbed. Therefore, there arises a fear that the electromagnetic-force generating portion and the sleeve cannot smoothly be assembled. Moreover, the contact between the electromagnetic-force generating portion and the valve housing or the sleeve propagates impact to the connection portion between the electronic control unit and the metal connection terminal, thus causing a risk of a defective contact to occur.

In general, when the electronic control unit and the electromagnetic-force generating portion are connected to each other, the assembly can, as a matter of course, easily be performed when a metal connection terminal is used to establish the connection. Therefore, the foregoing pressure control apparatus does not enable the electronic control unit and the electromagnetic-force generating portion to be readily connected to each other.

SUMMARY OF THE INVENTION

The present invention has been made in view of the above, and therefore an object of the present invention is to provide a pressure control apparatus which enables the electromagnetic-force generating portion and the sleeve to be readily assembled and which has such a structure that the electromagnetic-force generating portion and the electronic control unit, which are electric parts, and the sleeve and the valve housing, which are mechanical parts, are individually assembled to separate the assembling operation for the parts and the connection between the electronic control unit and the electromagnetic-force generating portion is established by at least a connection terminal made of conductive metal so as to simplify the assembling operation.

To solve the foregoing technical problems, according to the present invention, there is provided a pressure control apparatus which comprises:

an electronic control unit;

an electromagnetic-force generating portion including a solenoid electrically connected to the electronic control unit, a bobbin around which the solenoid is wound and a yoke surrounding at least two ends of the bobbin and a surface of the bobbin around which the solenoid is wound and forming a magnetic flux passage;

a valve housing accommodating a movable plunger which is operated when electric power is supplied to the solenoid and having a sleeve which is inserted into the yoke and the bobbin; and a casing secured to the valve housing and covering the electronic control unit, the electromagnetic-force generating portion and the sleeve;

wherein the casing has a base plate portion which divides the inner portion of the casing into a chamber in which the electronic control unit is disposed and a chamber in which the electromagnetic-force generating portion is disposed and to which the electronic control unit is secured to an end thereof, the bobbin has a connection terminal to which an end of the wound solenoid is connected and which is made of conductive metal, the electronic control unit and the electromagnetic-force generating portion are electrically connected to each other by at least the connection terminal, and a transition permission portion is provided between the portion of the yoke and that of the bobbin opposite to each other in the axial direction of the sleeve so that the yoke is movable with respect to the bobbin in the axial direction of the sleeve.

It is preferable that a transition permission portion is as well as provided for a portion of the yoke and that of the sleeve opposite to each other in a direction perpendicular to the axial direction of the sleeve so that the yoke is movable with respect to the bobbin also in the direction perpendicular to the axial direction of the sleeve.

It is preferable that an urging member for urging the yoke toward the valve housing is provided.

It is preferable that the base plate portion is disposed in the casing in a direction perpendicular to the axial direction of the sleeve and an urging member for urging the yoke toward the valve housing in such a manner that another end of the base plate portion is used as a support surface is disposed.

it is preferable that a holding portion for supporting the yoke in such a manner that the yoke is capable of moving with respect to the bobbin in the axial direction of the sleeve.

It is preferable that the holding portion supports the yoke in such a manner that the yoke is capable of moving with respect to the bobbin also in a direction perpendicular to the axial direction of the sleeve.

It is preferable that the yoke has a hole, and a hook portion serving as the holding portion arranged to be engaged into the hole of the yoke to support the yoke in such a manner that the yoke is capable of moving with respect to the bobbin in the axial direction of the sleeve is provided for another end of the base plate portion.

It is preferable that the yoke has a hole, and a hook portion serving as the holding portion arranged to be engaged into the hole of the yoke to support the yoke in such a manner that the yoke is capable of moving with respect to the bobbin also in a direction perpendicular to the axial direction of the sleeve is provided for another end of the base plate portion.

It is preferable that the base plate portion is disposed in the casing in a direction perpendicular to the axial direction of the sleeve, the yoke has a hole, a projection projecting toward the valve housing is provided for another end of the base plate portion, an engaging recess is provided for at least either of a surface of the casing which is in parallel to the axial direction of the sleeve or the projection, and an urging portion for urging the yoke toward the valve housing in such a manner that another side of the base plate portion is used as a support surface, a first hook portion arranged to be engaged into the hole of the yoke to support the yoke in such a manner that the yoke is capable of moving with respect to the bobbin in the axial direction of the sleeve and a second hook portion arranged to be engaged into the engaging recess are provided.

It is preferable that the first hook portion is also engaged into the hole of the yoke to support the yoke in such a manner that the yoke is capable of moving with respect to the bobbin also in a direction perpendicular to the axial direction of the sleeve.

It is preferable that the yoke is composed of a yoke body portion facing an end of two ends of the bobbin adjacent to the valve housing and a surface around which the solenoid is wound and a yoke and facing another end of the bobbin, the yoke body portion and the yoke end respectively are inserted into the hole of the bobbin and provided with projections into which the sleeve is inserted, and the hole of the yoke is formed in the surface of the yoke body portion facing the surface of the bobbin around which the solenoid is wound.

The pressure control apparatus according to a first aspect of the present invention has such a structure that the electromagnetic-force generating portion is assembled to the electronic control unit through the connection terminal, the bobbin is secured while being supported by at least a connection portion of the connection terminal to the electronic control unit, or the electronic control unit or the base plate portion, and the transition permission member is provided between the portion of the yoke and that of the bobbin opposite to each other in the axial direction of the sleeve. Therefore, the yoke is capable of moving with respect to the bobbin in the axial direction of the sleeve. When the casing provided with the electronic control unit and the electromagnetic-force generating portion is assembled to the valve housing, the sleeve is inserted into the bobbin and the yoke so that the yoke is brought into contact with the valve housing and thus the same is pressed, and pushed upwards and moved in the axial direction of the sleeve.

In addition to the effect obtained by the first aspect of the invention, the pressure control apparatus according to a second aspect of the invention having such a structure that the transition permission member between the portion of the yoke and that of the bobbin opposite to each other in the direction perpendicular to the axial direction of the sleeve enables the yoke to be moved with respect to the bobbin in the direction perpendicular to the axial direction of the sleeve.

If somewhat positional deviation takes place between the electromagnetic-force generating portion and the sleeve, that is, between the sleeve insertion hole of the yoke and the bobbin and the sleeve when the casing provided with the electronic control unit and the electromagnetic-force generating portion is assembled to the valve housing, the yoke and the sleeve are brought into contact with each other so that the yoke is moved with respect to the bobbin in the direction perpendicular to the axial direction of the sleeve. Therefore, the positional deviation can be absorbed and the electromagnetic-force generating portion and the sleeve can smoothly be assembled.

In addition to the effects obtained by the first and second aspects of the invention, the pressure control apparatus according to the third aspect of the invention having such a structure that the yoke is pressed to the valve housing causes the urging member to be compressed through the yoke. As a result, the yoke is moved in the axial direction of the sleeve when the urging member is compressed. However, the restoration force of the urging member presses and urges the yoke against the housing.

In addition to the effect obtained by the third aspect of the invention, the pressure control apparatus according to a fourth aspect of the invention has such a structure that the yoke is pushed to the valve housing sot hat the urging member is compressed through the yoke. The yoke is moved in the axial direction of the sleeve when the urging member is compressed. However, the restoration force of the urging member acting such that the other end of the base plate portion is used as the support surface causes the yoke to be pressed and urged to the housing.

In addition to the effect obtained by any one of the first to fourth aspects of the invention, the pressure control apparatus according to a fifth aspect of the invention enables the position of the yoke to be maintained by the holding portion in such a manner that the yoke is capable of moving with respect to the bobbin in the axial direction of the sleeve.

In addition to the effect obtained by the fifth aspect of the invention, the pressure control apparatus according to a sixth aspect of the invention enables the position of the yoke to be maintained by the holding portion in such a manner that the yoke is capable of moving with respect to the bobbin also in the direction perpendicular to the axial direction of the sleeve.

In addition to the effect obtained by the fifth aspect of the invention, the pressure control apparatus according to a seventh aspect of the invention has such a structure that the hook portion is engaged into the hole in the yoke so that the position of the yoke is maintained by the casing to enable the yoke to move with respect to the bobbin in the axial direction of the sleeve.

In addition to the effect obtained by the fifth aspect of the invention, the pressure control apparatus according to an eighth aspect of the invention has such a structure that the hook portion is engaged into the hole in the yoke so that the position of the yoke is capable of moving with respect to the bobbin in the axial direction of the sleeve and also in the direction perpendicular to the axial direction of the sleeve.

In addition to the effect obtained by the first or second aspect of the invention, the pressure control apparatus according to a ninth aspect of the invention has such a structure that the first hook portion of the yoke holding member is engaged into the hole in the yoke in such a manner that the yoke is capable of moving with respect to the bobbin in the axial direction of the sleeve. Moreover, the second hook portion of the yoke holding member is engaged into the engaging recess of the projection projecting over the base plate portion or the engaging recess in the casing so that the position of the yoke is maintained by the casing. Since the casing provided with the electronic control unit and the electromagnetic-force generating portion is assembled to the valve housing and the sleeve is inserted into the bobbin and the yoke, and the yoke is pressed against the valve housing, the urging portion of the yoke holding member is compressed through the yoke. When the urging portion is compressed, the yoke is moved in the axial direction of the sleeve. However, the restoration force of the urging portion acting in such a manner that the other end of the base plate portion is used as the supporting surface causes the yoke to be pressed and urged to the housing In addition to the effect obtained by the ninth aspect of the invention, the pressure control apparatus according to a tenth aspect of the invention has such a structure that the first hook portion of the yoke holding member is engaged in such a manner that the yoke is capable of moving with respect to the bobbin also in the direction perpendicular to the axial direction of the sleeve. If somewhat positional deviation takes place between the electromagnetic-force generating portion and the sleeve, that is, between the sleeve insertion holes of the yoke and the bobbin and the sleeve when the casing provided with the electronic control unit and the electromagnetic-force generating portion is assembled to the valve housing, the yoke and the sleeve are brought into contact with each other so that the yoke is moved with respect to the bobbin in the direction perpendicular to the axial direction of the sleeve. As a result, the positional deviation can be absorbed sot that the electromagnetic-force generating portion and the sleeve are assembled smoothly.

In addition to the effect obtained by any one of the fifth to tenth aspects of the invention, the pressure control apparatus according to an eleventh aspect of the invention has such a structure that the projections of the yoke body portion and the yoke end are inserted into the holes of the bobbin so that the yoke is assembled to the bobbin. The sleeve is inserted into the projections of the yoke body portion and the yoke end so as to be inserted into the bobbin, that is, into the electromagnetic-force generating portion.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Preferred embodiments of the present invention will now be described further in detail.

Embodiment 1

Figure 1:
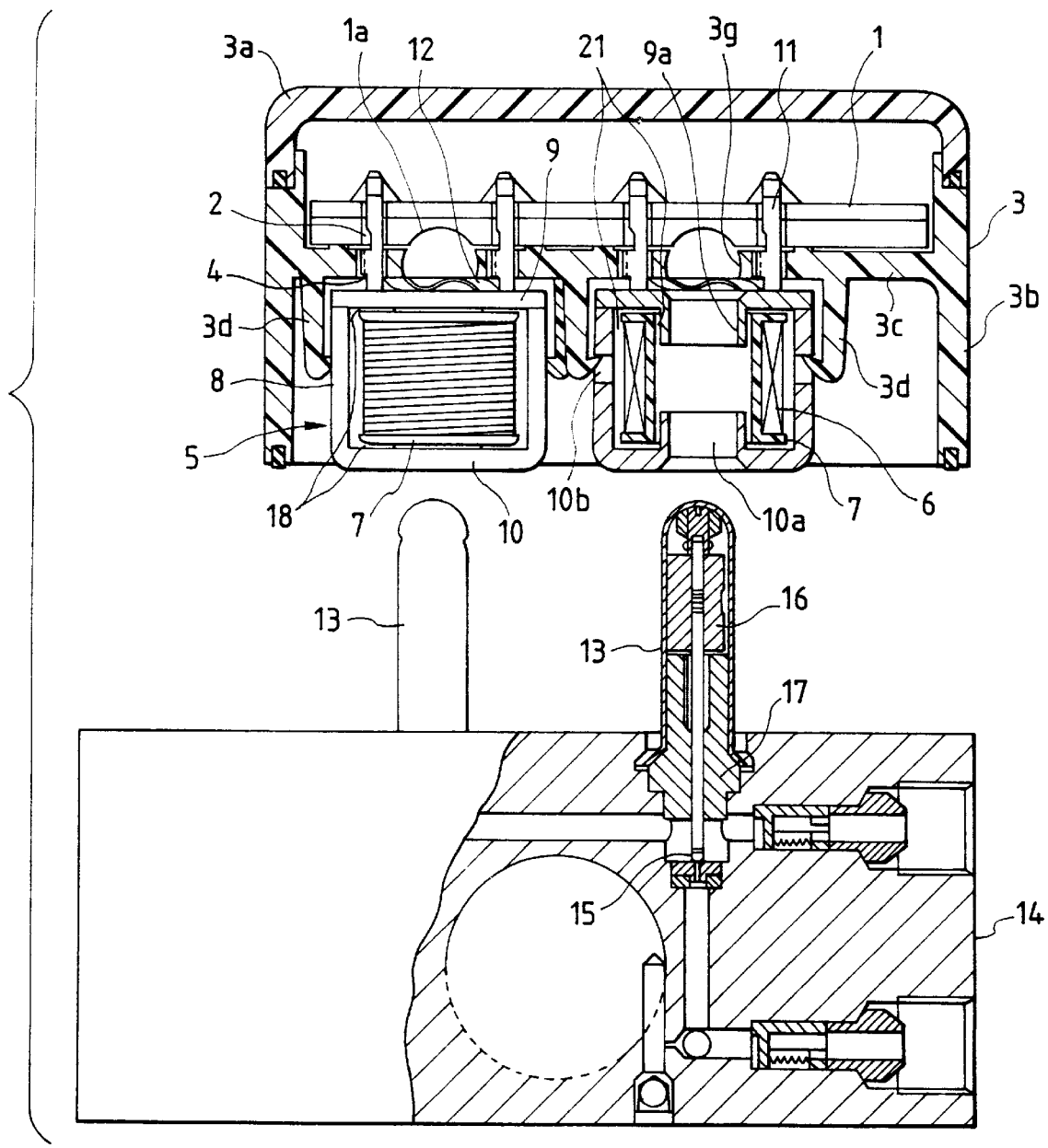
FIG. 1 is a cross sectional view showing an actuator for ABS for a vehicle according to Embodiment 1.
Figure 2:
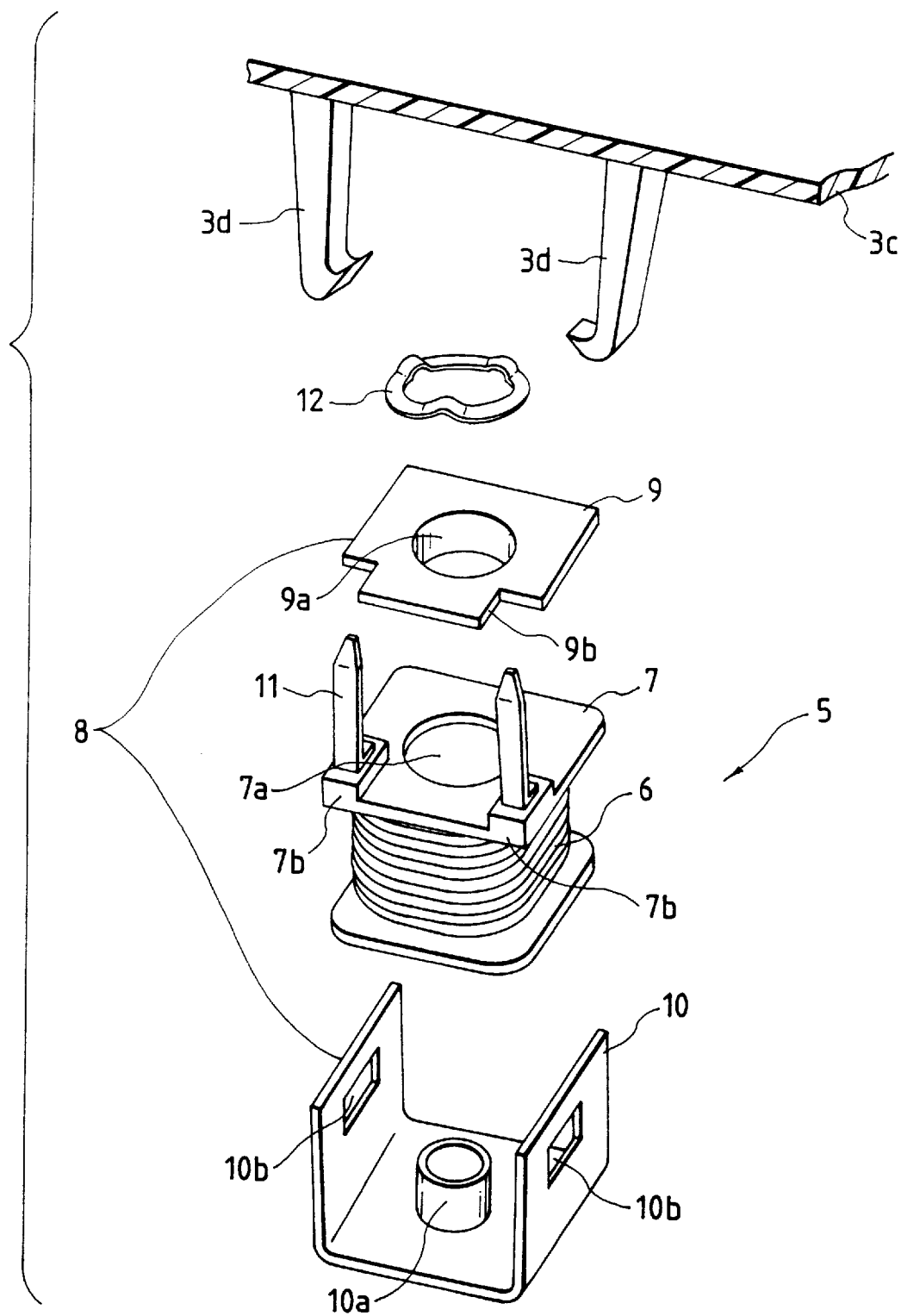
FIG. 2 is a partially enlarged perspective view of FIG. 1.
Figure 3:
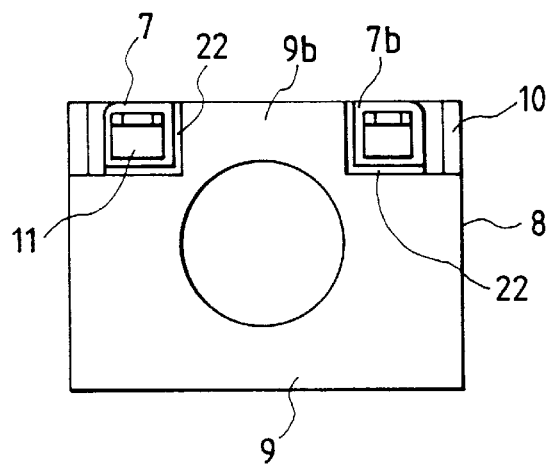
FIG. 3 is a partially enlarged top view of FIG. 1.
Figure 4:
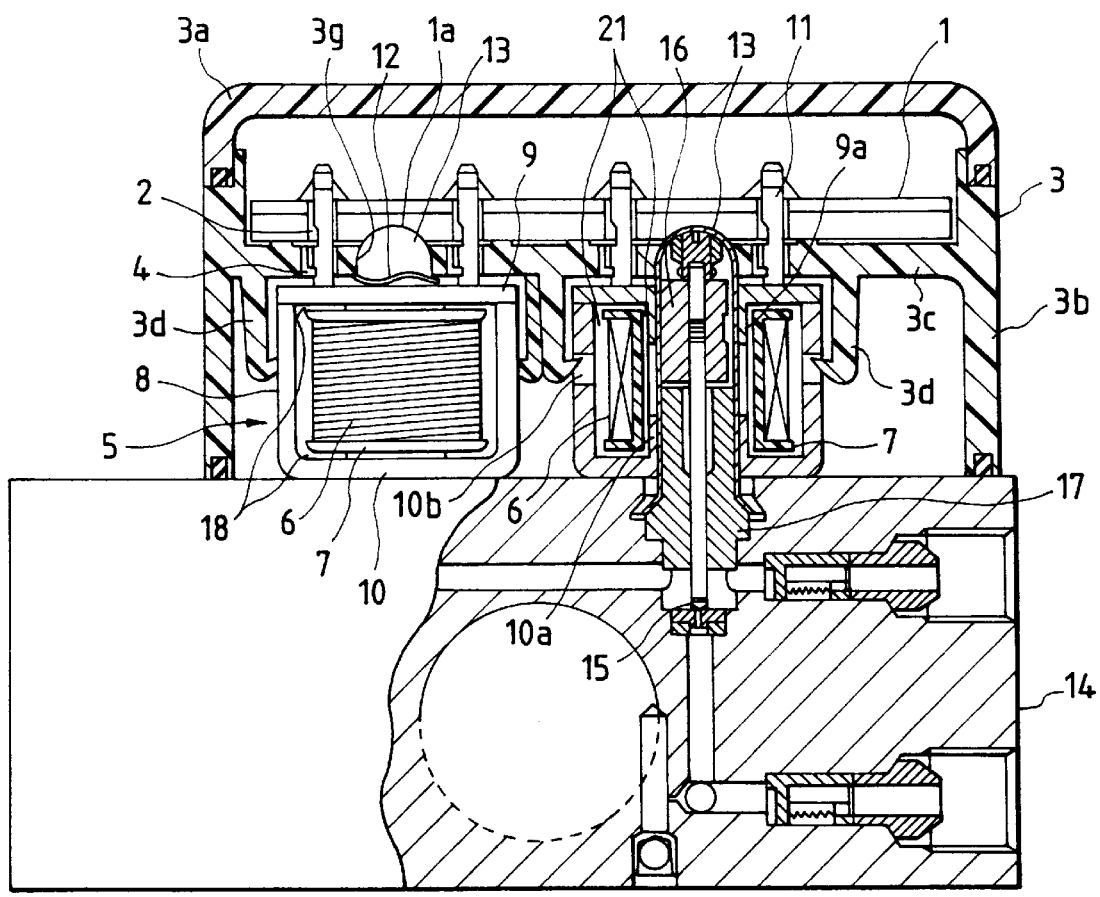
FIG. 4 is a cross sectional view showing an assembled state of FIG. 1.

FIG. 1 is a cross sectional view of an actuator for an antilock brake system (ABS) for an automobile comprising a pressure control apparatus according to the eighth and eleventh aspect of the invention, in which a state before a casing 3 and a valve housing 14 are assembled is illustrated. FIG. 2 is an exploded perspective view showing an electromagnetic-force generating portion 5. FIG. 3 is a top view showing a bobbin 7 to which a yoke 8 has been assembled. FIG. 4 is a cross sectional view hosing a state where the casing 3 and the valve housing 14 have been assembled. As shown in FIG. 1, reference numeral 1 represents an electronic control unit having a connection hole 2 and a sleeve insertion recess 1a and secured to either side of a base-plate portion 3c formed integrally with a casing body portion 3b of the casing 3 in a direction perpendicular to the axial direction of the sleeve 13 so as to divide inner space into a chamber in which the electronic control unit 1 is disposed and a chamber in which the electromagnetic-force generating portion 5 is disposed. The base plate portion 3 has guide holes 4 at positions opposite to the connection holes 2 and holes 3g through which the sleeves 13 are inserted. The electromagnetic-force generating portion 5 is composed of the solenoids 6, bobbins 7 around each of which the solenoid 6 is wound, and yokes 8 made of a magnetic material, each surrounding the bobbin 7 and forming a magnetic-flux passage. The sleeves 13 to be mounted on the electromagnetic-force generating portion 5 are mounted on the valve housing 14. The sleeve 13 includes a movable plunger 16 which is operated when electric power has been supplied to the solenoid 6 so as to open/close a valve portion 15 and a fixed core 17. The valve housing 14 forms a portion of a hydraulic-pressure passage formed from a brake master cylinder of a vehicle to a brake (not shown) of wheels.

Referring to FIG. 2, an end of a connection terminal 11 made of conductive metal is secured to a projection 7b on the bobbin 7 (at a side end of the base-plate portion 3c). An end of the wound solenoid 6 is connected to an end of the connection terminal 11. The yoke 8 is formed into a quadrilateral shape and composed of a yoke end 9 opposite to the upper portion of the bobbin 7 and a yoke body portion 10 opposite to the side portion (facing the side around which the solenoid 6 is wound) and the lower portion (the portion adjacent to the valve housing 14) of the bobbin 7. The yoke and 9 and the yoke body portion 10 respectively have cylindrical projections 9a and 10a which are arranged to be inserted into the hole 7a of the bobbin 7 and through which the sleeve 13 is inserted. The yoke and 9 has a flange portion 9b arranged to be engaged with a portion between the projections 7b of the bobbin 7. Holes 10b are formed in the side surface of the yoke body portion 10 which faces the portion in which the solenoid 6 of the bobbin 7 is wound. Hook portions 3d arranged to be engaged into the holes 10b of the yoke body portion 10 are formed integrally with the other end of the base plate portion 3c.

As shown in FIGS. 1 to 3, a projection 9a of the yoke end 9 is inserted into the hole 7a of the bobbin 7 around which the solenoid 6 is wound so that the yoke end 9 is engaged into the space between the projections 7b. The projection 10a of the yoke body portion 10 is inserted so that the yoke 8 is fitted to the bobbin 7. A wave washer 12, which is an urging member, is disposed on the top surface of the yoke end 9. Thus, the hook portions 3d are elastically engaged into the holes 10b of the yoke 8. Another end of the connection terminal 11 is, through a guide hole 4, inserted into a connection hole 2 of the electronic control unit 1, followed by being connected by soldering. As a result, the electromagnetic-force generating portion 5 is held by the electronic control unit 1 and the casing 3. In particular, the bobbin 7 is, through the connection terminal 11, held by the electronic control unit 1, while the yoke 8 is, through the hook portion 3d, held by the base-plate portion 3c. In addition, the wave washer 12 is interposed between the yoke end 9 and the base-plate portion 3c. Moreover, a gap 18 serving as a transition permission member is formed between the portion of the yoke 8 and that of the bobbin 7 opposite to each other in the direction perpendicular to the axial direction of the sleeve 13, that is, between the inner surface of the yoke end 9 and the upper portion of the bobbin 7 and between the inner surface of the yoke body portion 10 facing the lower portion of the bobbin 7 and the lower portion of the bobbin 7. Gaps 21 and 22 serving as transition allowable spaces are formed between the portions of the yoke 8 and the bobbin 7 opposite to each other in the direction perpendicular to the axial direction of the sleeve 13, that is, between the outer surfaces of the projections 9a and 10a of the yoke 8 and the inner surface of the hole 7a of the bobbin 7, between the inner surface of the side portion of the yoke body portion 10 and the side portion of the bobbin 7, and between the yoke end 9 and the flange portion 9b opposite to the projection 7b of the bobbin 7 and the projection 7b.

Referring to FIG. 4, the upper casing portion 3a of the casing 3 covering the electronic control unit 1 is, in a water-tight manner, secured to the casing body portion 3b so that the casing 3 to which the electronic control unit 1 and the electromagnetic-force generating portion 5 are fitted is, in a watertight manner, secured to the valve housing 14 with bolts (not shown). As a result, the sleeves 13 are inserted into the projections 9a and 10a of the yoke 8. Thus, the sleeves 13 are inserted into the bobbin 7, that is, the electromagnetic-force generating portion 5, that is, wave washer 12, the hole 3g of the base-plate portion 3c and the recess 1a of the electronic control unit 1. As a result, the yoke body portion 10 of the yoke 8 is brought into contact with the valve housing 14 and thus the same is pressed. Since the gap 18 is provided between the portions of the yoke 8 and the bobbin 7 opposite to each other in the axial direction of the sleeve 13, the yoke 8 is capable of moving in the axial direction of the sleeve 13 with respect to the bobbin 7. Moreover, the hole 10b of the yoke 8 and the hook portion 3d are engaged with each other in such a manner that the yoke 8 is capable of moving in the axial direction of the sleeve 13 with respect to the bobbin 7. Therefore, the yoke 8 is pushed upwards when viewed in FIG. 4 so that the yoke body portion 10 is pressed. As a result, also the yoke end 9 is pressed, thus causing the wave washer 12 being compressed. Thus, the yoke 8 is moved in the axial direction of the sleeve 13 when the wave washer 12 is compressed. However, a restoration force of the wave washer 12 acting such that the other end of the base-plate portion 3c serves as the support surface results in the yoke 8 being pressed and urged to the valve housing 14.

If somewhat degree of deviation in terms of the position takes place between the electromagnetic-force generating portion 5 and the sleeve 13, that is, between the projections 9a and 10b and the sleeve 13 when the casing 3 is fitted to the valve housing 14, the gasp 21 and 22 formed between the portion of the yoke 8 and that of the bobbin 7 opposite to each other in the direction perpendicular to the axial direction of the sleeve 13 enable the yoke 8 to be moved in the direction perpendicular to the axial direction of the sleeve 13 with respect to the bobbin 7. Moreover, the hole 10b of the yoke 8 and the hook portion 3d are engaged with each other in such a manner that the yoke 8 is moved in the direction perpendicular to the axial direction of the sleeve 13 with respect to the bobbin 7 so that the yoke 8 and the sleeve 13 are brought into contact with each other. Thus, the sleeve 13 is relatively moved with respect to the bobbin 7 in the direction perpendicular to the axial direction of the sleeve 13. As a result, the deviation in terms of the position between the projections 9a and 10a of the yoke 8 and the sleeve 13 can be absorbed so that the electromagnetic-force generating portion 5 and the sleeve 13 are smoothly fitted to each other.

As described above, the pressure control apparatus according to the present invention has the gap 18 formed between the yoke 8 and the bobbin 7 in the axial direction of the sleeve 13. Moreover, the hole 10b of the yoke 8 and the hook portion 3d are engaged with each other in such a manner that the yoke 8 is capable of moving relative to the bobbin 7 in the axial direction of the sleeve 13. Therefore, in a case where the casing 3 having the electronic control unit 1 and the electromagnetic-force generating portion 5 is fitted to the valve housing 14 and the yoke 8 is brought into contact with the valve housing 14 and therefore raised by the valve housing 14, the yoke 8 can be moved in the axial direction of the sleeve 13. Since the yoke 8 is not brought into contact with the bobbin 7, the pressure from the valve housing 14 is not applied to the bobbin 7, that is, the pressure is not applied to the connection portion between the connection terminal 11 and the connection hole 2 of the electronic control unit 1. That is, the connection between the connection terminal 11 and the connection hole 2, that is, the electronic control unit 1 can always be maintained in a safety state. Moreover, gaps 21 and 22 are formed between the portion of the yoke 8 and that of the bobbin 7 opposite to each other in the direction perpendicular to the axial direction of the sleeve 13. In addition, the hole 10b of the yoke 8 and the hook portion 3d are engaged with each other in such a manner that the yoke 8 is cable of moving relatively to the bobbin 7 in the axial direction of the sleeve 13. As a result, if somewhat degree of deviation in terms of the position takes place between the electromagnetic-force generating portion 5 and the sleeve 13 when the casing 3 having the electronic control unit 1 and the electromagnetic-force generating portion 5 is fitted to the valve housing 14, the yoke and the sleeve 13 are brought into contact with each other so that the sleeve 13 is relatively moved with respect to the bobbin 7 in the direction perpendicular to the axial direction of the sleeve 13. As a result, the deviation in terms of the position between the electromagnetic-force generating portion 5 and the sleeve 13 can be absorbed. Thus, the electromagnetic-force generating portion 5 and the sleeve 13 can smoothly be fitted to each other.

Therefore, the electromagnetic-force generating portion 5 and the sleeve 13 can smoothly be fitted to each other. By individually fitting the electromagnetic-force generating portion 5 and the electronic control unit 1 which are electric parts and the sleeve 13 and the valve housing 14 which are mechanical parts, a pressure control apparatus can be provided in which the assembling operation is divided for each part and the assembling operation can be simplified because the connection between the electronic control unit 1 and the electromagnetic-force generating portion 5 is established by using the connection terminal 11 made of conductive metal.

Since the yoke 8 is, by the wave washer 12, pressed and urged toward the valve housing 14, a state where the yoke 8 is always in contact with the valve housing 14 can be maintained after the casing 3 has been fitted to the valve housing 14. As a result, looseness of the yoke 8 in the casing 3 can be restrained. In addition, the yoke 8 is composed of the two elements, that is, the yoke end 9 ad the yoke body portion 10. After the casing 3 has been fitted to the valve housing 14, the yoke 8 is, by the wave washer 12, urged toward the valve housing 14. Therefore, the yoke end 9 and the top end of the side surface of the yoke body portion 10 are capable of always maintaining the connected state. Therefore, magnetism circulating from, for example, the projection 9a to pass through the movable plunger 16, the fixed core 17, the projection 10a, the yoke body portion 10, the yoke end 9 and the projection 9a can be transmitted without any loss.

Moreover, since the yoke 8 is, by the hook portion 3d, supported by the casing 3, the position of the yoke 8 can always and stably be maintained.

Since the yoke 8 is composed of the two elements consisting of the yoke end 9 and the yoke body portion 10 and the same comprises the cylindrical projection 9a and 10a, the yoke 8 can furthermore easily be fitted to the bobbin 7. Moreover, the positional deviation of holes of the yoke 8 and the bobbin 7 for inserting the sleeve 13 can be prevented so that insertion of the sleeve 13 is facilitated. In addition, transmission of magnetism among the yoke 8, the movable plunger 16 and the fixed core 17 can be made to be satisfactory.

Since the projections 7b are formed on the upper surface of the bobbin 7 and the flange portion 9b is provided for the yoke end 9 so that the flange portion 9b is engaged between projection 7b, relative rotation of the yoke end 9 with respect to the axial direction of the sleeve 13 is restrained.

Although this embodiment has such a structure that the yoke 8 is formed in the quadrilateral shape, the shape is not limited to this. For example, the pressure control apparatus according to the present invention and having a yoke in the form of a cubic shape surrounding the bobbin 7 or a cylindrical yoke is capable of attaining similar advantages.

In this embodiment, although the two holes 10b are formed in the yoke 8, the two hooks 3d, arranged to be engaged into the two holes 10b, are formed in the base plate portion 3c and the one yoke 8 is engaged and supported by the two hooks 3d, the structure is not limited to this. For example, a pressure control apparatus according to the present invention and having a structure in which the yoke is formed into a cubic shape surrounding the overall body of the bobbin 7, three holes are formed in the side surface of the cubic yoke, and three hook portions, arranged to be engaged into the three holes, are provided for the base plate portion so that the three hook portions are engaged with one yoke is capable of attaining a similar advantages.

Although this embodiment has such a structure that the yoke 8 has the hole 10b to which the hook portion 3d is engaged, the structure is not limited to this. The shape is required only to permit the engagement of the hook portion. A pressure control apparatus according to the present invention comprising, for example, a groove or a recess is capable of attaining a similar effect.

Although this embodiment has such a structure that the wave washer 12 is provided, the structure is not limited to the foregoing urging member. A pressure control apparatus according to the present invention comprising, for example, a coil spring or a leaf spring is capable of attaining a similar advantage.

Although this embodiment has such a structure that the hole 3g or the recess 1a for inserting the sleeve 13 is formed in the base plate portion 3c and the electronic control unit 1 for the purpose of space saving so that the sleeve 13 is inserted, the shape is not limited to this. A pressure control apparatus according to the present invention comprising, for example, a casing structure in which the sleeve is not inserted into the base plate portion and the electronic control unit is capable of attaining a similar advantage.

Although this embodiment has such a structure that the connection terminal 11 is, through the guide hole 4, inserted into the connection hole 2 and connected by soldering so that the electronic control unit 1 and the electromagnetic-force generating portion 5, that is, the bobbin 7 are connected to each other, the structure is not limited to this. A pressure control apparatus according to the present invention may have such a structure that the electronic control unit 1 has a connection terminal which is connected to the connection terminal 11, and the connection between the foregoing connection terminal and the connection terminal 11 established by welding causes the electronic control unit 1 and the electromagnetic-force generating portion 5, that is, the bobbin 7 to be connected to each other, and the bobbin 7 is supported and secured such that the connection portion between the connection terminal and the connection terminal 11 is used as a support point. In this case, a similar advantage can be obtained.

Although this embodiment has such a structure that the gaps 18, 21 and 22 are provided as the transition permission portions, a pressure control apparatus according to the present invention comprising, for example, an elastic member serving as the transition permission member is capable of attaining a similar advantage.

Although the invention has been described in its preferred form with a certain degree of particularity, it is understood that the present invention is not limited to the foregoing form and, therefore, includes a variety of forms within the scope of the invention.

Embodiment 2

Figure 5:
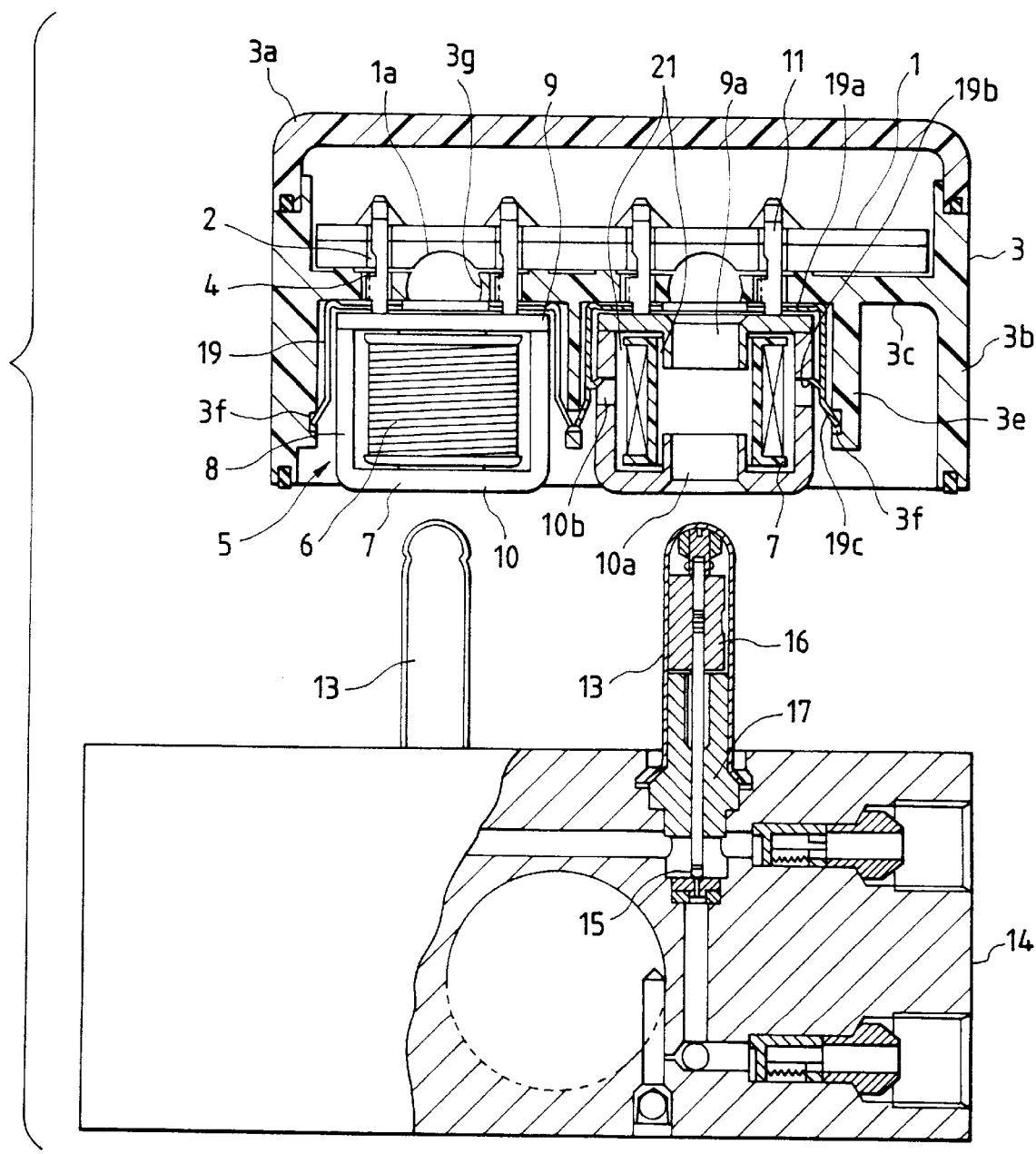
FIG. 5 is a cross sectional view showing an actuator for an ABS for a vehicle according to Embodiment 2.
Figure 6:
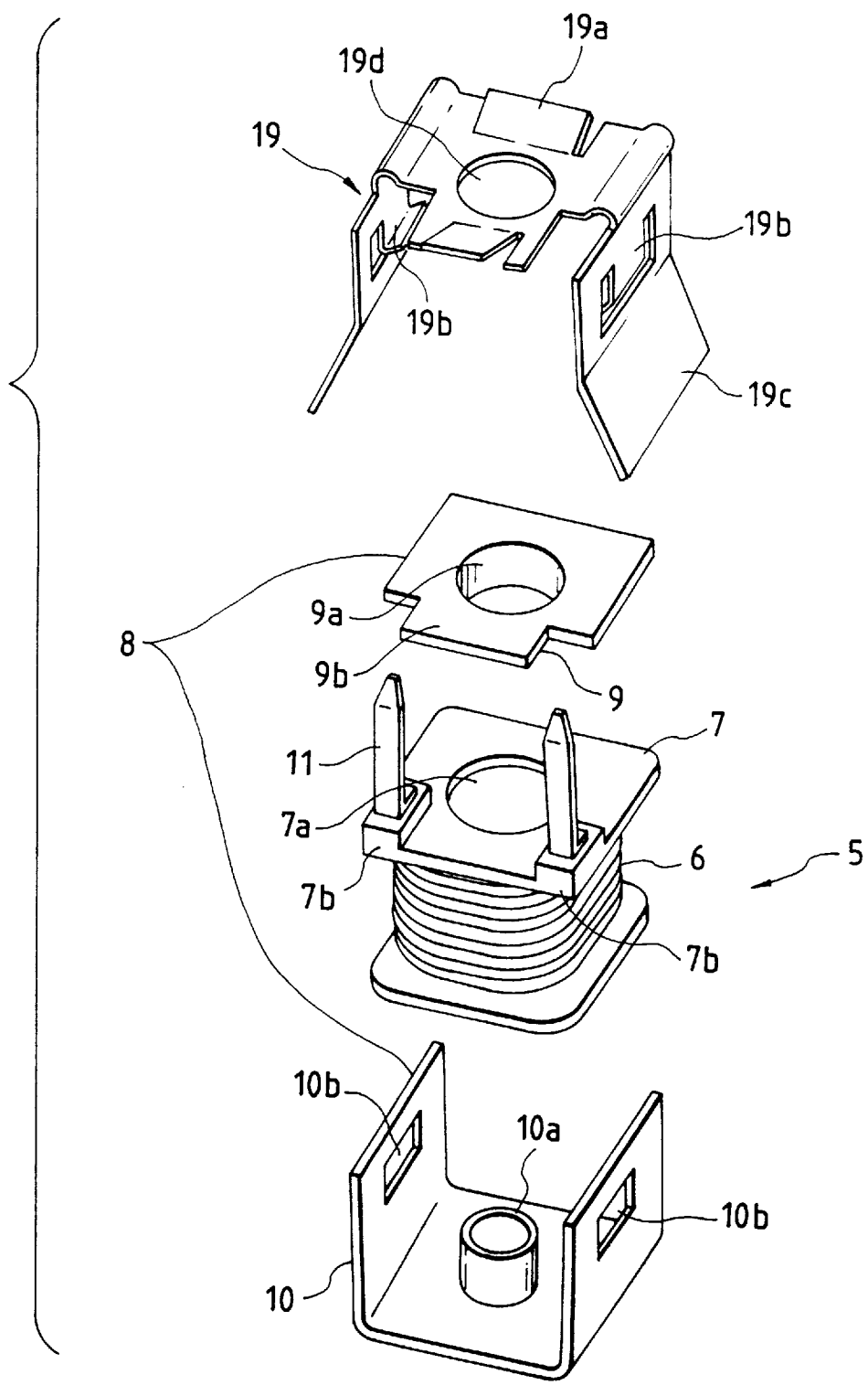
FIG. 6 is a partially enlarged perspective view of FIG. 5.
Figure 7:
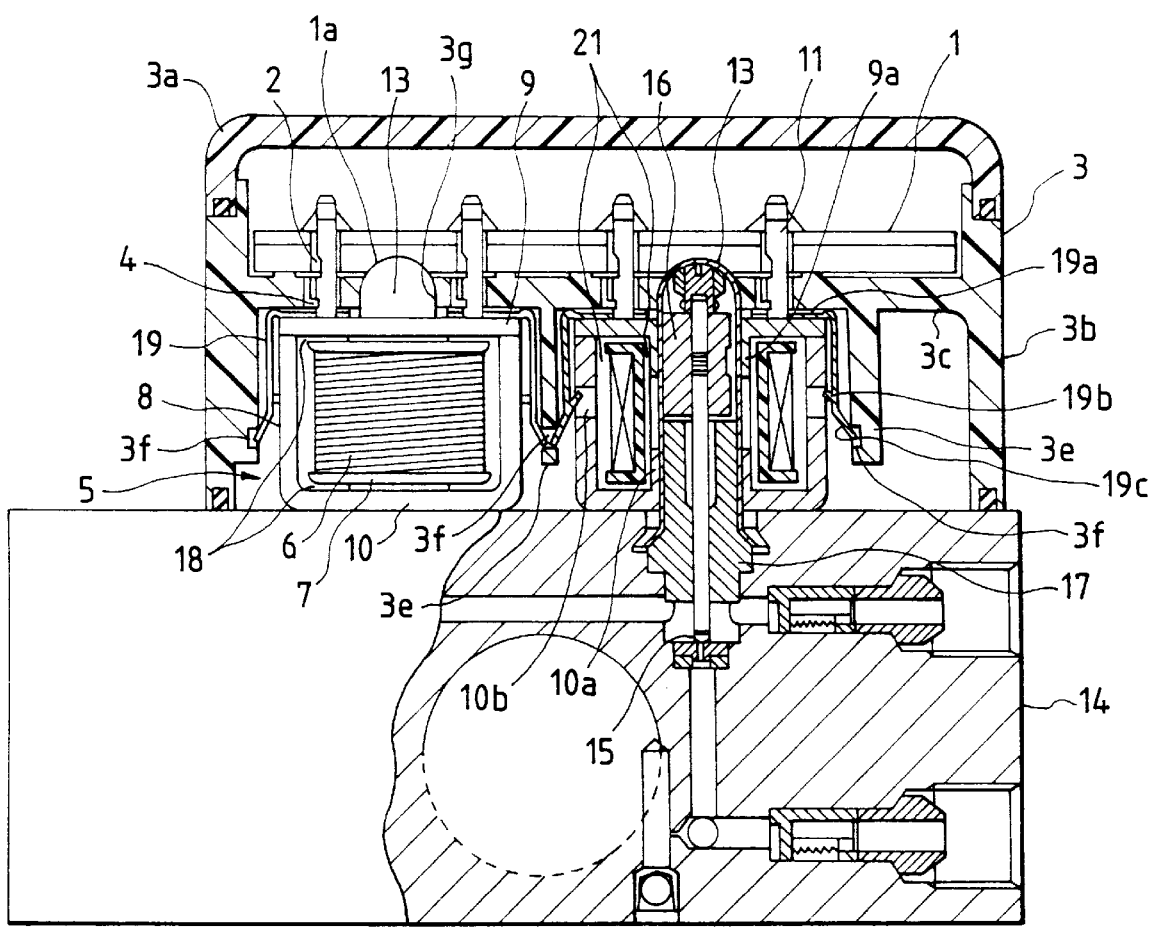
FIG. 7 is a cross sectional view showing an assembled sate of FIG. 5.

FIG. 5 is a cross sectional view showing an actuator for an antilock brake system (ABS) for a vehicle using a pressure control apparatus according to the tenth and eleventh aspects of the invention, in which a state before the casing 3 and the valve housing 14 are fitted is illustrated. FIG. 6 is an exploded perspective view showing the electromagnetic-force generating portion 5 shown in FIG. 5. FIG. 7 is a cross sectional view showing a state where the casing 3 and the valve housing 14 have been fitted. Since the top view of the bobbin 7 to which the yoke 8 has been fitted is similar to FIG. 3 showing Embodiment 1, description will be performed with reference to FIG. 3. Note that the same elements as those according to Embodiment 1 are given the same reference numerals. As shown in FIG. 5, reference numeral 1 represents an electronic control unit having a connection hole 2 and an insertion recess 1a for inserting a sleeve 13 and secured to either side of a base-plate portion 3c formed integrally with a casing body portion 3b of the casing 3 in a direction perpendicular to the axial direction of the sleeve 13 so as to divide the space into a chamber in which the electronic control unit 1 is disposed and a chamber in which the electromagnetic-force generating portion 5 is disposed. The base plate portion 3c has guide holes 4 at positions opposite to the connection holes 2 and holes 3g through which the sleeves 13 are inserted. The electromagnetic-force generating portion 5 is composed of the solenoids 6, bobbins 7 around each of which the solenoid 6 is wound, and yokes 8 made of a magnetic material, each surrounding the bobbin 7 and forming a magnetic-flux passage. The sleeves 13 to be fitted to the electromagnetic-force generating portion 5 are mounted on the valve housing 14. The sleeve 13 accommodates a movable plunger 16 which is operated when electric power has been supplied to the solenoid 6 so as to open/close a valve portion 15 and a fixed core 17. The valve housing 14 forms a portion of a hydraulic-pressure passage formed from a brake master cylinder of a vehicle to a brake (not shown) of wheels.

Referring to FIG. 6, an end of a connection terminal 11 made of conductive metal is secured to a projection 7b on the bobbin 7 (at a side end of the base-plate portion 3c). An end of the wound solenoid 6 is connected to an end of the connection terminal 11. The yoke 8 is formed into a quadrilateral shape and composed of a yoke end 9 opposite to the upper portion of the bobbin 7 and a yoke body portion 10 opposite to the side portion (facing the side around which the solenoid 6 is wound) and the lower portion (the portion adjacent to the valve housing 14) of the bobbin 7. The yoke end 9 and the yoke body portion 10 respectively have cylindrical projections 9a and 10a which are arranged to be inserted into the hole 7a of the bobbin 7 and through which the sleeve 13 is inserted. The yoke end 9 has a flange portion 9b arranged to be engaged with a portion between the projections 7b of the bobbin 7. Holes 10b are formed in the side surface of the yoke body portion 10 which faces the portion in which the solenoid 6 of the bobbin 7 is wound.

The yoke holding member 19 is formed into a U-shape facing side and has, in the surface thereof opposite to the yoke end 9, and a hole 19d into which the sleeve 13 is inserted and an urging portion 19a formed into a leaf-spring-like shape bent upwards. Moreover, a first hook portion 19b bent inwards so as to be engaged into a hole 10b of the yoke 8 is formed on the surface opposite to the side surface of the yoke body portion 10. A tag portion 19c is provided which serves as a second hook portion downwards extending from the surface having the first hook portion 19b to expand outwardly. Thus, the yoke holding member 19 is formed integrally.

Referring to FIGS. 3, 5 and 6, a projection 3e projecting over another end of the base plate portion 3c toward the valve housing 14 is formed integrally. The inner surface of the side portion of the casing body portion 3b facing the projection 3e and the side portion of the bobbin 7 has a recess 3f to which the tag 19c of the yoke holding member 19 is engaged.

A projection 9a of the yoke end 9 is inserted into the hole 7a of the bobbin 7 around which the solenoid 6 is wound so that a flange portion 9b is engaged between the projections 7b of the bobbin 7. The projection 10a of the yoke body portion 10 is inserted so that the yoke 8 is fitted to the bobbin 7. The first hook portions 19a of the yoke holding member 19 are elastically engaged into the holes 10b of the yoke 8 so that the yoke 8 and the bobbin 7 are fitted to the yoke holding member 19. Another end of the connection terminal 11 is, through the guide hole 4, connected to the connection hole 2 of the electronic control unit 1 by soldering. The tag 19c of the yoke holding member 19 is engaged with the projection 3e and the recess 3f of the casing body portion 3b so that the electromagnetic-force generating portion 5 is held by the electronic control unit 1 and the casing 3. In particular, the bobbin 7 is, through the connection terminal 11, held by the base plate portion 3c and the casing body portion 3b. Moreover, a gap 18 is formed between the portion of the yoke 8 and that of the bobbin 7 opposite to each other in the direction perpendicular to the axial direction of the sleeve 13, that is, between the inner surface of the yoke body portion 10, which faces the lower portion of the bobbin 7, and the lower portion of the bobbin 7. Gaps 21 and 22 serving as transition allowable spaces are formed between the portions of the yoke 8 and the bobbin 7 opposite to each other in the direction perpendicular to the axial direction of the sleeve 13, that is, between the outer surfaces of the projections 9a and 10a of the yoke 8 and the inner surface of the hole 7a of the bobbin 7, between the inner surface of the side portion of the yoke body portion 10 and the side portion of the bobbin 7, and between the yoke end 9 and the flange portion 9b opposite to the projection 7b of the bobbin 7 and the projection 7b.

Referring to FIG. 7, the upper casing portion 3a of the casing 3 covering the electronic control unit 1 is, in a watertight manner, secured to the casing body portion 3b so that the casing 3 to which the electronic control unit 1 and the electromagnetic-force generating portion 5 are fitted is, in a watertight manner, secured to the valve housing 14 with bolts (not shown). As a result, the sleeves 13 are inserted into the projections 9a and 10a of the yoke 8 and the hole 19d of the yoke holding member 19. Thus, the sleeves 13 are inserted into the bobbin 7, that is, the electromagnetic-force generating portion 5, the hole 3g of the base plate portion 3c and the recess a of the electronic control unit 1. The yoke body portion 10 of the yoke 8 is brought into contact with the valve housing 14 so as to be pressed. Since the gap 18 is provided between the portions of the yoke 8 and the bobbin 7 opposite to each other in the axial direction of the sleeve 13, the yoke 8 is capable of moving in the axial direction of the sleeve 13 with respect to the bobbin 7. Moreover, since the hole 10b of the yoke 8 and the first hook portion 19b of the yoke holding member 19 are engaged with each other in such a manner that the yoke 8 is capable of moving with respect to the bobbin 7 in the axial direction of the sleeve 13, the yoke 8 is pushed upwards when viewed in FIG. 7 so that the yoke body portion 10 is pressed. Thus, the yoke end 9 is also pressed, and the urging portion 19a of the yoke holding member 19 is compressed. As a result, the yoke 8 is moved in the axial direction of the sleeve 13 when the urging portion 19a is compressed. However, the restoration portion 19a presses and urges the yoke 8 to the valve housing 14.

If somewhat degree of deviation in terms of the position takes place between the electromagnetic-force generating portion 5 and the sleeve 13, that is, between the projections 9a and 10b and the sleeve 13 when the casing 3 is fitted to the valve housing 14, the gaps 21 and 22 formed between the portion of the yoke 8 and that of the bobbin 7 opposite to each other in the direction perpendicular to the axial direction of the sleeve 13 enable the yoke 8 to be moved in the direction perpendicular to the axial direction of the sleeve 13 with respect to the bobbin 7. Moreover, the hole 10b of the yoke 8 and the first hook portion 19b of the yoke holding member 19 are engaged with each other in such a manner that the yoke 8 is also capable of moving in the direction perpendicular to the axial direction of the sleeve 13 with respect to the bobbin 7. The yoke 8 and the sleeve 13 are brought into contact with each other so that the sleeve 13 is relatively moved with respect to the bobbin 7 in the direction perpendicular to the axial direction of the sleeve 13. As a result, the positional deviation between the projections 9a and 10a of the yoke 8 and the sleeve 13 can be absorbed. Thus, the electromagnetic-force generating portion 5 and the sleeve 13 are smoothly fitted to each other.

As described above, the pressure control apparatus according to the present invention has the gap 18 formed between the yoke 8 and the bobbin 7 in the axial direction of the sleeve 13. The yoke 8 is supported by the yoke holding member 19 in such a manner that the yoke 8 is capable of moving with respect to the bobbin 7 in the axial direction of the sleeve 13. Therefore, in a case where the casing 3 having the electronic control unit 1 and the electromagnetic-force generating portion 5 is fitted to the valve housing 14 and the yoke 8 is brought into contact with the valve housing 14 and therefore raised by the valve housing 14, the yoke 8 can be moved in the axial direction of the sleeve 13. Since the yoke 8 is not brought into contact with the bobbin 7, the pressure from the valve housing 14 is not applied to the bobbin 7, that is, the same is not applied to the connection portion between the connection terminal 11 and the connection hole 2 of the electronic control unit 1. That is, the connection between the connection terminal 11 and the connection hole 2, that is, the electronic control unit 1 can always be maintained in a safety state. Moreover, gaps 21 and 22 are defined between the portion of the yoke 8 and that of the bobbin 7 opposite to each other in the direction perpendicular to the axial direction of the sleeve 13. In addition, the yoke 8 is supported by the yoke holding member 19 in such a manner that the yoke 8 is capable of also moving in the direction perpendicular to the axial direction of the sleeve 13. As a result, if somewhat degree of deviation in terms of the position takes place between the electromagnetic-force generating portion 5 and the sleeve 13 when the casing 3 having the electronic control unit 1 and the electromagnetic-force generating portion 5 is fitted to the valve housing 14, the yoke 8 and the sleeve 13 are brought into contact with each other so that the sleeve 13 is relatively moved with respect to the bobbin 7 in the direction perpendicular to the axial direction of the sleeve 13. As a result, the deviation in terms of the position between the electromagnetic-force generating portion 5 and the sleeve 13 can be absorbed. Thus, the electromagnetic-force generating portion 5 and the sleeve 13 can smoothly be fitted to each other.

Therefore, the electromagnetic-force generating portion 5 and the sleeve 13 can smoothly be fitted to each other. By individually fitting the electromagnetic-force generating portion 5 and the electronic control unit 1 which are electric parts and the sleeve 13 and the valve housing 14 which are mechanical parts, a pressure control apparatus can be provided in which the assembling operation is divided for each part and the assembling operating can be simplified because the connection between the electronic control unit 1 and the electromagnetic-force generating portion 5 is established by using the connection terminal 11 made of conductive metal.

Since the yoke 8 is pressed and urged by the urging portion 19a of the yoke holding member 19 toward the valve housing 14 such that the base-plate portion 3c is used as the support surface, a state where the yoke 8 is always in contact with the valve housing 14 can be maintained after the casing 3 has been fitted to the valve housing 14. As a result, looseness of the yoke 8 in the casing 3 can be restrained. In addition, the yoke 8 is composed of the two elements, that is, the yoke end 9 and the yoke body portion 10. After the casing 3 has been fitted to the valve housing 14, the yoke 8 is, by the urging portion 19a, urged toward the valve housing 14. Therefore, the yoke end 9 and the top end of the side surface of the yoke body portion 10 are capable of always maintaining the connected state. Therefore, magnetism circulating from, for example, the projection 9a to pass through the movable plunger 16, the fixed core 17, the projection 10a, the yoke body portion 10, the yoke upper portion 9 and the projection 9a can be transmitted without loss.

Moreover, since the yoke 8 is supported to the casing 3 by the yoke holding member 19, the position of the yoke 8 can always and stably be maintained.

Since the yoke 8 is made up of the two elements consisting of the yoke end 9 and the yoke body portion 10 and yoke 8 can furthermore easily be fitted to the bobbin 7. Moreover, the positional deviation of the holes of the yoke 8 and the bobbin 7 for inserting the sleeve 13 can be prevented so that insertion of the sleeve 13 is facilitated. In addition, transmission of magnetism among the yoke 8, the movable plunger 16 and the fixed core 17 can be made to be satisfactory.

Since the projections 7*b* are formed on the upper surface of the bobbin 7 and the flange portion 9*b* is provided for the yoke end 9 and that the flange portion 9*b* is engaged between projections 7*b*, relative rotation of the yoke upper portion 9 with respect to the axial direction of the sleeve 13 is restrained.

Although the yoke is formed into the quadrilateral shape in this embodiment, the structure is not limited to this. For example, a pressure control apparatus according to the present invention comprising, for example, a cubic yoke surround the overall body of the bobbin 7 or a cylindrical yoke is capable of attained a similar advantage.

In this embodiment, those two holes 10*b* are formed in the yoke 8, the two first hook portions 19*b*, arranged to be engaged into the two holes 10*b*, are formed in yoke holding member 19. Thus, the one yoke 8 is engaged and supported by the two first hook portions 19*b*. The structure is not limited to this. For example, a pressure control apparatus according to the present invention and having a structure in which the yoke is formed into a cubic shape surrounding the overall body of the bobbin 7, three holes are defined in the side surface of the cubic yoke, and three first hook portions, arranged to be engaged into the three holes, are provided for the yoke holding member so that the three first hook portions are engaged with one yoke is capable of attaining a similar advantages.

Although this embodiment has the structure such that the yoke 8 has the hole 10*b* to which the first hook portion 19*b* is engaged, the structure is not limited to this. The shape is simply required to permit the engagement of the first hook portion 19*b*. A pressure control apparatus according to the present invention comprising, for example, a groove or a recess formed in the yoke 8 is capable of attaining a similar effect.

Although this embodiment has such a structure that the yoke holding member 19 has the two tags 19*c* serving as the second hook portion and the engaging recess 3*f* is formed in the projection 3*e* and the casing body portion 3*b* to correspond to the tags 19*c*, the structure is not limited to this. A pressure control apparatus according to the present invention comprising, for example, a yoke holding member having three tags serving as the second hook portions and engaging recesses formed in the projection and the casing body portion is capable of attaining a similar advantage.

Although this embodiment has such a structure that the recesses 3*f* for engaging the tag 19*c* of the yoke holding member 19 are provided for the projection 3*e* and the casing body portion 3*b*, the structure is not limited to this. A pressure control apparatus according to the present invention having such a structure that, for example, an engaging recess for engaging the tag 19*c* of the yoke holding member 19 is provided for only the projection 3*e* is capable of attaining a similar advantage.

Although this embodiment has such a structure that the recess 3*f* for engaging the tag 19*c* of the yoke holding member 19 is provided, the structure is not limited to this. For example, an engaging cut groove or an engaging hole may be formed. Although the tag 19*c* is formed to serve as the second hook portion of the yoke holding member 19, the structure is not limited to this.

Although this embodiment has such a structure that the urging portion 19*a* of the yoke holding member 19 is formed into the leap spring shape, the structure is not limited to this. A pressure control apparatus according to the present invention comprising, for example, a yoke holding member having an urging portion in the form of a counter sunk spring is capable of attaining a similar advantage.

Although this embodiment has such a structure that the hole 3*g* or the recess 1*a* for inserting the sleeve 13 is formed in the base plate portion 3*c* and the electronic control unit 1 for the purpose of space saving so that the sleeve 13 is inserted, the shape is not limited to this. A pressure control apparatus according to the present invention comprising, for example, a casing structure in which the sleeve is not inserted into the base plate portion and the electronic control unit is capable of attaining a similar advantage.

Although this embodiment has such a structure that the connection terminal 11 is, through the guide hole 4, inserted into the connection hole 2 and connected by soldering so that the electronic control unit 1 and the electromagnetic-force generating portion 5, that is, the bobbin 7 are connected to each other, the structure is not limited to this. A pressure control apparatus according to the present invention may have such a structure that the electronic control unit 1 has a connection terminal which is connected to the connection terminal 11, and the connection between the foregoing connection terminal and the connection terminal 11 established by welding causes the electronic control unit 1 and the electromagnetic-force generating portion 5, that is, the bobbin 7 to be connected to each other, and the bobbin 7 is supported and secured such that the connection portion between the connection terminal and the connection terminal 11 is used as a support point. In this case, a similar advantage can be obtained.

Although this embodiment has such a structure that the gaps 18, 21 and 22 are provided as the transition permission portions, a pressure control apparatus according to the present invention comprising, for example, an elastic member serving as the transition permission member is capable of attaining a similar advantage.

Although the invention has been described in its preferred form with a certain degree of particularity, it is understood that the present invention is not limited to the foregoing form and, therefore, includes a variety of forms within the scope of the invention.

(Embodiment 3)

Figure 8:
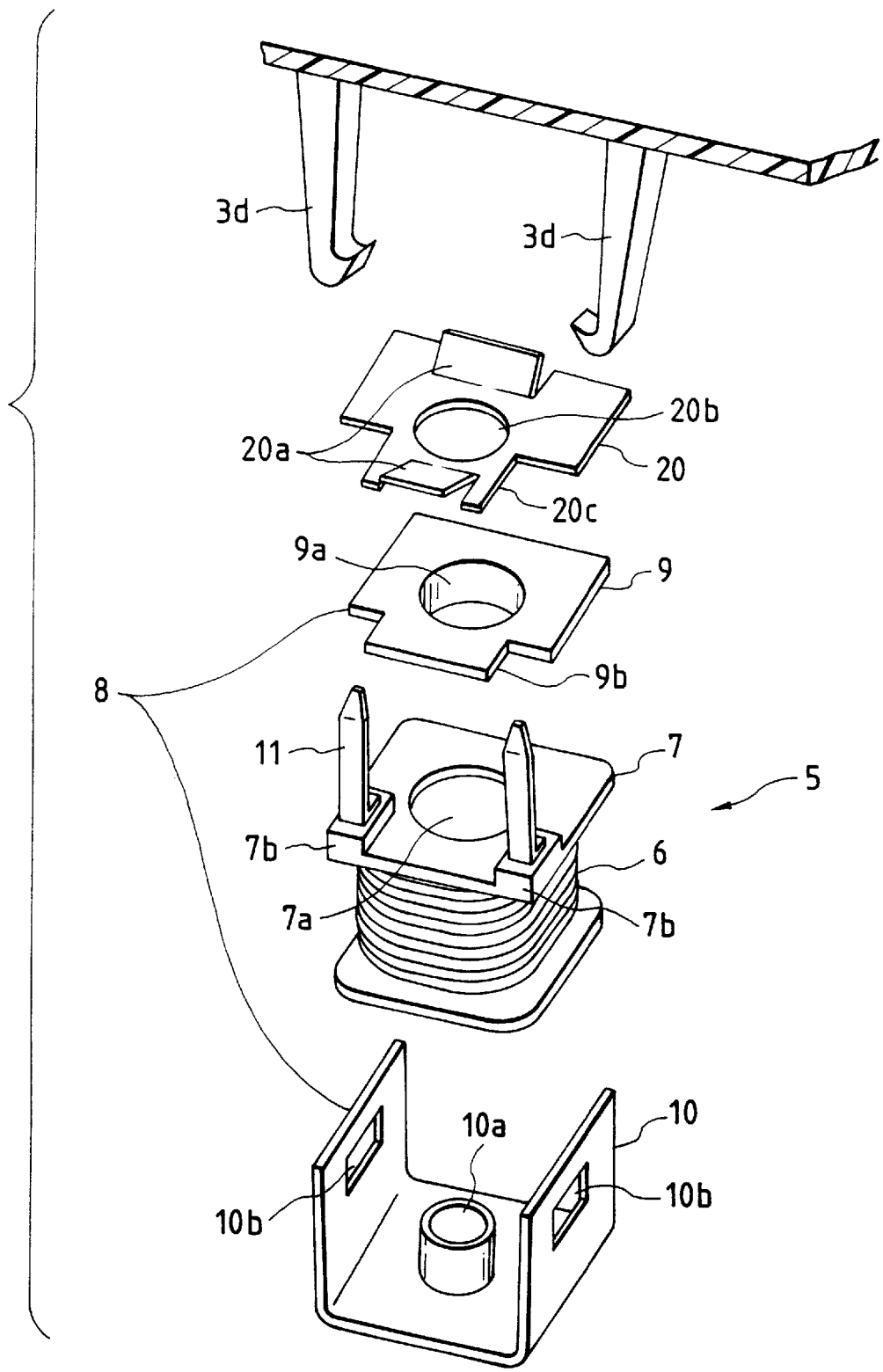
FIG. 8 is an exploded perspective view of an electromagnetic-force generating portion according to Embodiment 3.

FIG. 8 is an exploded perspective view showing an electromagnetic-force generating portion 5 of an actuator for an antilock brake system (ABS) for a vehicle comprising the pressure control apparatus according to the eighth and tenth aspects of the invention. Since the structure is similar to that in Embodiment 1 except a plate 20, the similar elements are omitted from description. As shown in FIG. 8, an end of a connection terminal 11 made of conductive metal is secured to a projection 7*b* on the bobbin 7 (at a side end of the base-plate portion 3*c*). An end of the wound solenoid 6 is connected to an end of the connection terminal 11. The yoke 8 is formed into a quadrilateral shape and composed of a yoke and 9 opposite to the upper portion of the bobbin 7 and a yoke body portion 10 opposite to the side portion (facing the side around which the solenoid 6 is wound) and the lower portion (the portion adjacent to the valve housing 14) of the bobbin 7. The yoke end 9 and the yoke body portion 10 respectively have cylindrical projections 9*a* and 10*a* which are arranged to be inserted into the hole 7*a* of the bobbin 7 and through which the sleeve 13 is inserted. The yoke end 9 has a flange portion 9*b* arranged to be engaged with a portion between the projections 7*b* of the bobbin 7. Holes 10*b* are formed in the side surface of the yoke body portion 10 which faces the portion in which the solenoid 6 of the bobbin 7 is wound. Hook portions 3*d* arranged to be engaged into the holes 10*b* of the yoke body portion 10 are formed integrally with the other end of the base plate portion 3*c*. The plate 20 serving as the urging member has a raised urging portion 20a and hole 20b for inserting the sleeve 13 and a flange portion 20c which is engaged with a portion between the projections 7b of the bobbin 7.

A projection 9a of the yoke end 9 is inserted into the hole 7a of the bobbin 7 around which the solenoid 6 is wound so that the flange portion 9b is engaged into the space between the projections 7b. The projection 10a of the yoke body portion 10 is inserted so that the yoke 8 is fitted to the bobbin 7. A plate 20 is disposed on the top surface of the yoke upper portion 9 in such a manner that the flange portion 20C is engaged between the projections 7b. The hook portions 3d are elastically engaged into the holes 10b of the yoke 8. Another end of the connection terminal 11 is, through a guide hole 4, inserted into a connection hole 2 of the electronic control unit 1, followed by being connected by soldering. As a result, the electromagnetic-force generating portion 5 is held by the electronic control unit 1 and the casing 3. In particular, the bobbin 7 is, through the connection terminal 11, held by the electronic control unit 1, while the yoke 8 is, through the hook portion 3d, held by the base-plate portion 3c. In addition, the plate 12 is interposed between the yoke end 9 and the base plate portion 3c. Moreover, a gap 18 serving as a transition permission member is formed between the portion of the yoke 8 and that of the bobbin 7 opposite to each other in the direction perpendicular to the axial direction of the sleeve 13, that is, between the inner surface of the yoke end 9 and the upper portion of the bobbin 7 and between the inner surface of the yoke body portion 10 facing the lower portion of the bobbin 7 and the lower portion of the bobbin 7. Gaps 21 and 22 serving as transition allowable spaces are formed between the portions of the yoke 8 and the bobbin 7 opposite to each other in the direction perpendicular to the axial direction of the sleeve 13, that is, between the outer surfaces of the projections 9a and 10a of the yoke 8 and the inner surface of the hole 7a of the bobbin 7, between the inner surface of the side portion of the yoke body portion 10 and the side portion of the bobbin 7, and between the yoke end 9 and the flange portion 9b opposite to the projection 7b of the bobbin 7 and the projection 7b.

The upper casing portion 3a of the casing 3 covering the electronic control unit 1 is, in a water-tight manner, secured to the casing body portion 3b so that the casing 3 to which the electronic control unit 1 and the electromagnetic-force generating portion 5 are fitted is, in a watertight manner, secured to the valve housing 14 with bolts (not shown). As a result, the sleeves 13 are inserted into the projections 9a and 10a of the yoke 8. Thus, the sleeves 13 are inserted into the bobbin 7, that is, the electromagnetic-force generating portion 5, that is, a ring spring 12, the hole 3g of the base-plate portion 3c and the recess 1a of the electronic control unit 1. As a result, the yoke body portion 10 of the yoke 8 is brought into contact with the valve housing 14 and thus the same is pressed. Since the gap 18 is provided between the portions of the yoke 8 and the bobbin 7 opposite to each other in the axial direction of the sleeve 13, the yoke 8 is capable of moving in the axial direction of the sleeve 13 with respect to the bobbin 7. Moreover, the hole 10b of the yoke 8 and the hook portion 3d are engaged with each other in such a manner that the yoke 8 is capable of moving in the axial direction of the sleeve 13 with respect to the bobbin 7. Therefore, the yoke 8 is pushed upwards so that the yoke body portion 10 is pressed. As a result, the yoke end 9 is also pressed, thus causing the urging portion 20a being compressed. Therefore, the yoke 8 is moved in the axial direction of the sleeve 13 when the urging portion 20a is compressed. However, a restoration force of the urging portion 20a acting such that the other end of the base-plate portion 3c serves as the support surface results in the yoke 8 being pressed and urged to the valve housing 14.

If somewhat degree of deviation in terms of the position takes place between the electromagnetic-force generating portion 5 and the sleeve 13, that is, between the projections 9a and 10b and the sleeve 13 when the casing 3 is fitted to the valve housing 14, the gaps 21 and 22 formed between the portion of the yoke 8 and that of the bobbin 7 opposite to each other in the direction perpendicular to the axial direction of the sleeve 13 enable the yoke 8 to be moved in the direction perpendicular to the axial direction of the sleeve 13 with respect to the bobbin 7. Moreover, the hole 10b of the yoke 8 and the hook portion 3d are engaged with each other in such a manner that the yoke 8 is moved in the direction perpendicular to the axial direction of the sleeve 13 with respect to the bobbin 7 so that the yoke 8 and the sleeve 13 are brought into contact with each other. Thus, the sleeve 13 is relatively moved with respect to the bobbin 7 in the direction perpendicular to the axial direction of the sleeve 13. As a result, the deviation in terms of the position between the projections 9a and 10a of the yoke 8 and the sleeve 13 can be absorbed so that the electromagnetic-force generating portion 5 and the sleeve 13 are smoothly fitted to each other.

Since the plate 20 is engaged between the projections 7b of the bobbin 7, the rotation of the sleeve 13 with respect to the 5 relative to the axial direction of the sleeve 13 is restrained. Since other effects are the same as those obtainable from Embodiment 1, they are omitted from description.

(Embodiment 4)

Figure 9:
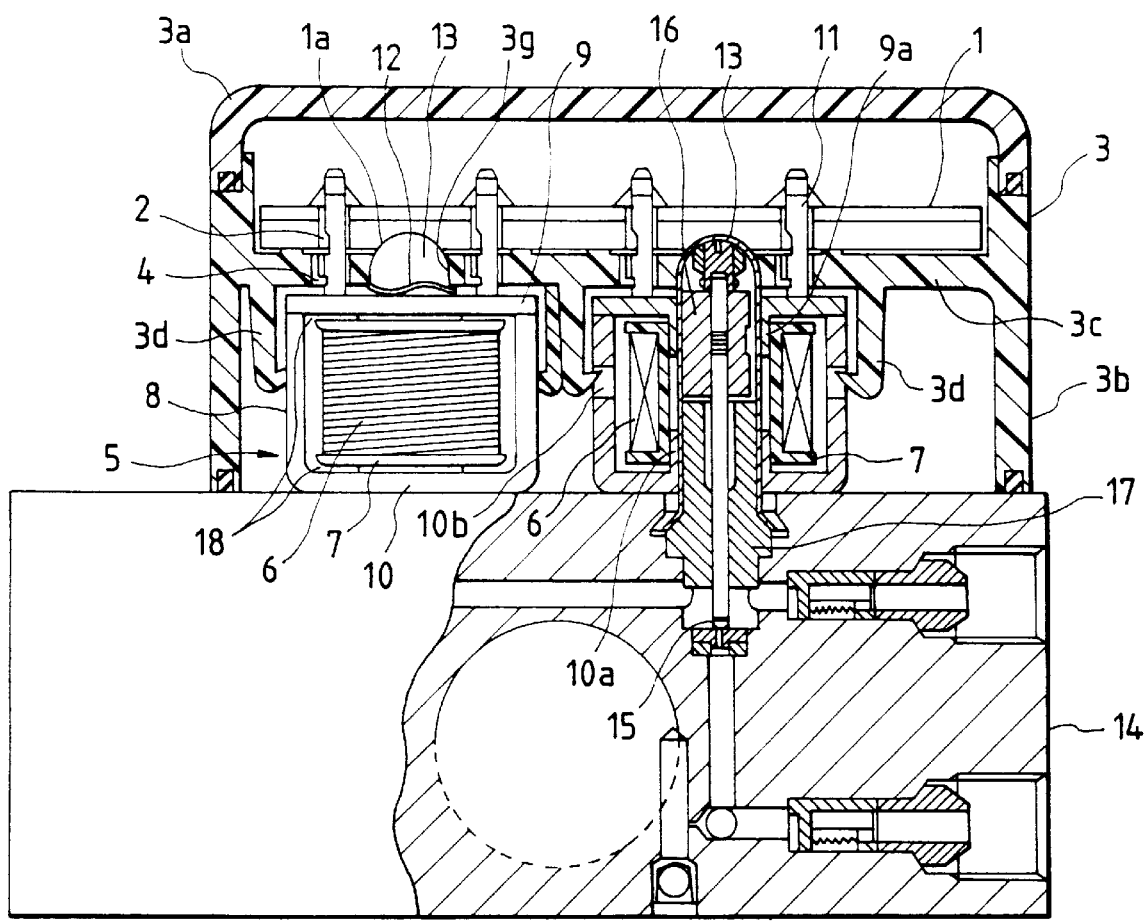
FIG. 9 is a cross sectional view showing an actuator for an ABS for a vehicle according to Embodiment 4.

FIG. 9 is a cross sectional view of an actuator for an antilock brake system (ABS) for an automobile comprising a pressure control apparatus according to the seventh and ninth aspects of the invention. Since the structure is similar to that in Embodiment 1 except the gaps 21 and 22 being omitted, the similar portions are omitted from description. As shown in FIG. 9, reference numeral 1 represents an electronic control unit having a connection hole 2 and a sleeve insertion recess 1a and secured to either side of a base-plate portion 3c formed integrally with a casing body portion 3b of the casing 3 in a direction perpendicular to the axial direction of the sleeve 13 so as to divide a space into a chamber in which the electronic control unit 1 is disposed and a chamber in which the electromagnetic-force generating portion 5 is disposed. The base plate portion 3 has guide holes 4 at positions opposite to the connection holes 2 and holes 3g through which the sleeves 13 are inserted. The electromagnetic-force generating portion 5 is made up of the solenoids 6, bobbins 7 around each of which the solenoid 6 is wound, and yokes 8 made of a magnetic material, each surrounding the bobbin 7 and forming a magnetic-flux passage. The sleeves 13 to be mounted on the electromagnetic-force generating portion 5 are mounted on the valve housing 14. The sleeve 13 includes a movable plunger 16 which is operated when electric power has been supplied to the solenoid 6 so as to open/close a valve portion 15 and a fixed core 17. The valve housing 14 forms a portion of a hydraulic-pressure passage formed from a brake master cylinder of a vehicle to a brake (not shown) of wheels. An end of a connection terminal 11 made of conductive metal is secured to a projection 7b on the bobbin 7, while an end of the wound solenoid 6 is connected to an end of the connection terminal 11.

The yoke 8 is formed into a quadrilateral shape and made up of a yoke end 9 opposite to the upper portion (side end of the base-plate portion 3c) of the bobbin 7 and a yoke body portion 10 opposite to the side portion (facing the side around which the solenoid 6 is wound) and the lower portion (the portion adjacent to the valve housing 14) of the bobbin 7. The yoke end 9 and the yoke body portion 10 respectively have cylindrical projections 9a and 10a which are arranged to be inserted into the hole 7a of the bobbin 7 and through which the sleeve 13 is inserted. The yoke end 9 has a flange portion 9b arranged to be engaged with a portion between the projections 7b of the bobbin 7. Holes 10b are formed in the side surface of the yoke body portion 10 which faces the portion in which the solenoid 6 of the bobbin 7 is wound. Hook portions 3d arranged to be engaged into the holes 10b of the yoke body portion 10 are formed integrally with the other end of the base plate portion 3c.

A projection 9a of the yoke end 9 is inserted into the hole 7a of the bobbin 7 abound which the solenoid 6 is wound so that the flange portion 9b is engaged between the projections 7b. The projection 10a of the yoke body portion 10 is inserted so that the yoke 8 is fitted to the bobbin 7. A wave washer 12, which is an urging member, is disposed on the top surface of the yoke end 9. Thus, the hook portions 3d are elastically engaged into the holes 10b of the yoke 9. Another end of the connection terminal 11 is, through a guide hole 4, inserted into a connection hole 2 of the electronic control unit 1, followed by being connected by soldering. As a result, the electromagnetic-force generating portion 5 is held by the electronic control unit 1 and the casing 3. In particular, the bobbin 7 is, through the connection terminal 11, held by the electronic control unit 1, while the yoke 8 is held by the base-plate portion 3c through the hook portion 3d.

In addition, the wave washer 12 is interposed between the yoke end 9 and the base-plate portion 3c. Moreover, a gap 18 serving as a transition permission member is formed between the portion of the yoke 8 and that of the bobbin 7 opposite to each other in the direction perpendicular to the axial direction of the sleeve 13, that is, between the inner surface of the yoke end 9 and the upper portion of the bobbin & and between the inner surface of the yoke body portion 10 facing the lower portion of the bobbin 7 and the lower portion of the bobbin 7.

The upper casing portion 3a of the casing 3 covering the electronic control unit 1 is, in a water-tight manner, secured to the casing body portion 3b so that the casing 3 to which the electronic control unit 1 and the electromagnetic-force generating portion 5 are fitted is, in a watertight manner, secured to the valve housing 14 with bolts (not shown). As a result, the sleeves 13 are inserted into the projections 9a and 10a of the yoke 8. Thus, the sleeves 13 are inserted into the bobbin &, that is, the electromagnetic-force generating portion 5, that is, the ring spring 12, the hole 3g of the base-plate portion 3c and the recess 1a of the electronic control unit 1. As a result, the yoke body portion 10 of the yoke 8 is brought into contact with the valve housing 14 and thus the same is pressed. Since the gap 18 is provided between the portions of the yoke 8 and the bobbin 7 opposite to each other in the axial direction of the sleeve 13, the yoke 8 is capable of moving in the axial direction of the sleeve 13 with respect to the bobbin 7. Moreover, the hole 10b of the yoke 8 and the hook portion 3d are engaged with each other in such a manner that the yoke 8 is capable of moving in the axial direction of the sleeve 13 with respect to the bobbin 7. Therefore, the yoke 8 is pushed upwards when viewed in FIG. 9 so that the yoke body portion 10 is pressed. As a result, the yoke end 9 is pressed, thus causing the wave washer 12 to be compressed. Thus, the yoke 8 is moved in the axial direction of the sleeve 13 when the wave washer 12 is compressed. However, a restoration force of the wave washer 12 acting such that the other end of the base-plate portion 3c serves as the support surface results in the yoke 8 being pressed and urged to the valve housing 14.

As described above, the pressure control apparatus according to this embodiment has the gap 18 formed between the yoke 8 and the bobbin 7 in the axial direction of the sleeve 13. Moreover, the hole 10b of the yoke 8 and the hook portion 3d are engaged with each other in such a manner that the yoke 8 is capable of moving relative to the bobbin 7 in the axial direction of the sleeve 13. Therefore, in a case where the casing 3 having the electronic control unit 1 and the electromagnetic-force generating portion 5 is fitted to the valve housing 14 and the yoke 8 is brought into contact with the valve housing 14 and therefore raised by the valve housing 14, the yoke 8 can be moved in the axial direction of the sleeve 13. Since the yoke 8 is not brought into contact with the bobbin 7, the pressure from the valve housing 14 is not applied to the bobbin 7, that is, the same is not applied to the connection portion between the connection terminal 11 and the connection hole 2 of the electronic control unit 1. That is, the connection between the connection terminal 11 and the connection hole 2, that is, the electronic control unit 1 can always be maintained in a safety state.

Therefore, the electromagnetic-force generating portion 5 and the sleeve 13 can smoothly be fitted to each other. By individually fitting the electromagnetic-force generating portion 5 and the electronic control unit 1 which are electric parts and the sleeve 13 and the valve housing 14 which are mechanical parts, a pressure control apparatus can be provided in which the assembling operation is divided for each part and the assembling operation can be simplified because the connection between the electronic control unit 1 and the electromagnetic-force generating portion 5 is established by using the connection terminal 11 made of conductive metal.

The gap is formed between the inner sleeve of the cylindrical projections 9a and 10a of the yoke 8 and the outer surface of the sleeve 13. Therefore, if somewhat positional deviation takes place between the electromagnetic-force generating portion 5 and the sleeve 13 when the casing 3 having the electronic control unit 1 and the electromagnetic-force generating portion 5 is fitted to the valve housing 14, the positional deviation between the electromagnetic-force generating portion 5 and the sleeve 13 can be absorbed. Therefore, the electromagnetic-force generating portion 5 and the sleeve 13 can smoothly be fitted to each other.

Since the other effects are similar to those obtainable from Embodiment 1 except the yoke 8 being relatively movable with respect to the bobbin 7 in the direction perpendicular to the axial direction of the sleeve 13, they are omitted from description.

As described above, according to the first aspect of the invention, the transition permission portion is provided between the portion of the yoke and that of the bobbin which are opposite to each other in the direction perpendicular to the axial direction of the sleeve to enable the yoke to be moved with respect to the bobbin in the axial direction of the sleeve. Therefore, in a case where the casing having the electronic control unit and the electromagnetic-force generating portion is fitted to the valve housing and the yoke is brought into contact with the valve housing and therefore raised by the valve housing, the yoke can be moved in the axial direction of the sleeve. Since the yoke is not brought into contact with the bobbin, the pressure from the valve housing is not applied to the connection portion between the connection terminal and the connection portion of the electronic control unit. That is, the connection between the connection terminal and the electronic control unit can always be maintained in a safety state. Thus, the electromagnetic-force generating portion and the sleeve can smoothly be fitted to each other, By individually fitting the electromagnetic-force generating portion and the electronic control unit which are electric parts and the sleeve and the valve housing which are mechanical parts, a pressure control apparatus can be provided in which the assembling operation is divided for each part and the assembling operation can be simplified because the connection between the electronic control unit and the electromagnetic-force generating portion is established by using the connection terminal made of conductive metal.

According to the invention according to the second aspect of the invention, in addition to the effect obtained by the first aspect of the invention, the transition permission portion is provided between the portion of the yoke and that of the bobbin which are opposite to each other in the direction perpendicular to the axial direction of the sleeve so that the direction perpendicular to the axial direction of the sleeve. Therefore, the yoke is capable of being moved three-dimensionally with respect to the bobbin. Even is somewhat positional deviation takes place between the electromagnetic-force generation portion and the sleeve when the casing having the electronic control unit and the electromagnetic-force generating portion is fitted to the valve housing, the yoke is brought into contact with the sleeve so that the yoke is moved with respect to the bobbin in the direction perpendicular to the axial direction of the sleeve. Therefore, the positional deviation between the electromagnetic-force generating portion and the sleeve can be absorbed. As a result, the electromagnetic-force generating portion and the sleeve can smoothly be fitted to each other.

According to the invention according to the third aspect of the invention, in addition to the effect obtained by the first or second aspect of the invention, the structure in which the yoke is pressed and urged by the urging member toward the valve housing enables the yoke to maintain the state where it is always in contact with the valve housing after the casing has been fitted to the valve housing. Therefore, looseness of the yoke in the casing can be restrained.

According to the fourth aspect of the invention, in addition to the effect obtained by the third aspect of the invention, the structure in which the yoke is pressed and urged by the urging member toward the valve housing in such a manner that the other end of the base plate portion is used as the support surface enables the yoke to maintain the state where it is always in contact with the valve housing after the casing has been fitted to the valve housing. Therefore, looseness of the yoke in the casing can be restrained.

According to the fifth aspect of the invention, in addition to the effect obtained by any one of the first to fourth aspects of the invention, the yoke is capable of always maintaining the stable position while being movably supported by the holding portion with respect to the bobbin in the axial direction of the sleeve.

According to the sixth aspect of the invention, in addition to the effect obtained by the fifth aspect of the invention, the yoke is capable of always maintaining the stable position while being movably supported by the holding portion with respect to the bobbin as well as in the direction perpendicular to the axial direction of the sleeve.

According to the seventh aspect of the invention, in addition to the effect obtained by the fifth aspect of the invention, the yoke is supported by the casing while being enabled by the hook portion to be moved with respect to the bobbin in the axial direction of the sleeve so that the stable position is always maintained.

According to the eighth aspect of the invention, in addition to the effect obtained by the sixth aspect of the invention, the yoke is supported by the casing in a state where it is capable of moving with respect to the bobbin in the axial direction of the sleeve and also in the direction perpendicular to the axial direction of the sleeve by the hook portion so that the yoke is capable of always maintaining a stable position.

According to the ninth aspect of the invention, in addition to the effect obtained by the first aspect of the invention, the structure in which the yoke is pressed and urged toward the valve housing by the urging portion of the yoke holding member enables the yoke to always maintain the state where it is in contact with the valve housing after the casing has been fitted to the valve housing. Therefore, looseness of the yoke in the casing can be restrained. Since yoke is supported by the casing such that the first hook portion of the yoke holding member is engaged into the hole of the yoke while being movable in the axial direction of the sleeve with respect to the bobbin and the second hook portion of the yoke holding member is engaged with the projection or the engaging recess of the casing, a stable position can always be maintained.

According to the tenth aspect of the invention, in addition to the effect obtained by the ninth aspect of the inventiony, the first hook portion of the yoke holding member is engaged into the hole of the yoke in such a manner that the yoke is capable of moving with respect to the bobbin also in the direction perpendicular to the axial direction of the sleeve.

According to the eleventh aspect of the invention, in addition to the effects obtained by the fifth to tenth aspects of the invention, the yoke is made up of the yoke end portion and the yoke body portion and the yoke end portion and the yoke body portion respectively have projections arranged to be inserted into the holes in the yoke so that the yoke is easily fitted to the bobbin. Thus, the positional deviation between the yoke and the bobbin can be prevented.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pressure control apparatus comprising:
an electronic control unit;
an electromagnetic-force generating portion including a solenoid electrically connected to said electronic control unit, a bobbin around which said solenoid is wound and a yoke surrounding at least two ends of said bobbin and a surface of said bobbin around which said solenoid is wound and forming a magnetic flux passage;
a valve housing having a sleeve which is inserted into said yoke and said bobbin, and said sleeve accommodating a movable plunger which is operated when electric power is supplied to said solenoid; and a casing secured to said valve housing and covering said electronic control unit, said electromagnetic-force generating portion and said sleeve;

wherein said casing has a base plate portion extending an entire width of said casing and dividing an inner portion of said casing into a chamber in which said electronic control unit is disposed and a chamber in which said electromagnetic-force generating portion is disposed and to which said electronic control unit is secured to an end thereof, said base plate portion comprising a holding portion directly supporting said yoke, said bobbin has a connection terminal to which an end of said wound solenoid is connected and which is mode of conductive metal, said electronic control unit and said electromagnetic-force generating portion are electrically connected to each other by at least said connection terminal, and a transition permission portion is provided between the portion of said yoke and that of said bobbin opposite to each other in an axial direction of said sleeve so that said yoke is movable with respect to said bobbin in the axial direction of said sleeve; and an urging member for urging said yoke toward said valve housing.

2. A pressure control apparatus according to claim 1, wherein a transition permission portion is provided for a portion of said yoke and that of said sleeve opposite to each other in a direction perpendicular to the axial direction of said sleeve so that said yoke is movable with respect to said bobbin in a direction perpendicular to the axial direction of said sleeve.

3. A pressure control apparatus according to claim 1, wherein said base plate portion is disposed in said casing in a direction perpendicular to the axial direction of said sleeve and said urging member urges said yoke toward said valve housing in such a manner that another end of said base plate portion is used as a support surface.

4. A pressure control apparatus according to claim 1, wherein the holding portion supports said yoke in such a manner that said yoke is movable with respect to said bobbin in the axial direction of said sleeve.

5. A pressure control apparatus according to claim 4, wherein said holding portion supports said yoke in such a manner that said yoke is movable with respect to said bobbin also in a direction perpendicular to the axial direction of said sleeve.

6. A pressure control apparatus according to claim 4, wherein said yoke has a hole, and said holding portion comprises a hook portion which is arranged at another end of said base plate portion so as to be engaged into said hole of said yoke to support said yoke in such a manner that said yoke is movable with respect to said bobbin in the axial direction of said sleeve.

7. A pressure control apparatus according to claim 5, wherein said yoke has a hole, and said holding portion comprises a hook portion which is arranged at another end of said base plate portion so as to be engaged into said hole of said yoke to support said yoke in such a manner that said yoke is movable with respect to said bobbin also in a direction perpendicular to the axial direction of said sleeve.

8. A pressure control apparatus according to claim 1, wherein said base plate portion is disposed in said casing in a direction perpendicular to the axial direction of said sleeve, and said yoke has a hole;

said apparatus further comprising: a projection projecting toward said valve housing disposed at another end of said base plate portion; and engaging recess portion on at least one of a surface of said casing which is in parallel to the axial direction of said sleeve and said projection, and said holding portion including said urging member for urging said yoke toward said housing in such a manner that another end of said base plate portion is used as a support surface; a first hook portion for being engaged into said hole of said yoke to support said yoke in such a manner that said yoke is movable with respect to said bobbin in the axial direction of said sleeve; and a second hook portion for being engaged into said engaging recess.

9. A pressure control apparatus according to claim 8, wherein said first hook portion is engaged into said hole of said yoke to support said yoke in such a manner that said yoke is movable with respect to said bobbin in a direction perpendicular to the axial direction of said sleeve.

10. A pressure control apparatus according to claim 4, wherein said yoke includes a yoke body portion facing one end of two ends of said bobbin adjacent to said valve housing and a surface of said bobbin around which said solenoid is wound and a yoke end facing another end of said bobbin, said yoke body portion and said yoke end portion respectively have projections inserted into a hole of said bobbin, said sleeve is inserted into said projections, and said hole of said yoke is formed in the surface of said yoke body portion facing the surface of said bobbin abound which said solenoid is wound.

11. A pressure control apparatus comprising:

an electronic control unit;

an electromagnetic-force generating portion including a solenoid electrically connected to said electronic control unit, a bobbin around which said solenoid is wound and a yoke surrounding at least two ends of said bobbin and a surface of said bobbin around which said solenoid is wound and forming a magnetic flux passage;

a valve housing having a sleeve which is inserted into said yoke and said bobbin, and said sleeve accommodating a movable plunger which is operated when electric power is supplied to said solenoid; and a casing secured to said valve housing and covering said electronic control unit, said electromagnetic-force generating portion and said sleeve;

said casing having a base plate portion extending an entire width of said casing and dividing an inner portion of said casing into a chamber in which said electronic control unit is disposed and a chamber in which said electromagnetic-force generating portion is disposed and to which said electronic control unit is secured to an end thereof, said base plate portion comprising a holding portion directly supporting said yoke, said bobbin has a connection terminal to which an end of said wound solenoid is connected and which is made of conductive metal, said electronic control unit and said electromagnetic-force generating portion being electrically connected to each other by at least said connection terminal, and a transition permission portion provided between a portion of said yoke and a portion of said bobbin opposite to each other in an axial direction of said sleeve so that said yoke is movable with respect to said bobbin in the axial direction of said sleeve at least after said electromagnetic-force generating portion is assembled with said electronic control unit, and an urging member for urging said yoke toward said valve housing.

12. A pressure control apparatus according to claim 11, wherein a transition permission portion is provided between a portion of said yoke and a portion of said sleeve positioned opposite to each other in a direction perpendicular to the axial direction of said sleeve so that said yoke is movable with respect to said bobbin in a direction perpendicular to the axial direction of said sleeve at least after said electromagnetic-force generating portion is assembled with said electronic control unit.

13. A pressure control apparatus comprising:

an electronic control unit;

an electromagnetic-force generating portion including a solenoid electrically connected to said electronic control unit, a bobbin around which said solenoid is wound and a yoke surrounding at least two ends of said bobbin and a surface of said bobbin around which said solenoid is wound and forming a magnetic flux passage;

a valve housing having a sleeve which is inserted into said yoke and said bobbin, and said sleeve accommodating a movable plunger which is operated when electric power is supplied to said solenoid;

a casing secured to said valve housing and covering said electronic control unit, said electromagnetic-force generating portion and said sleeve;

wherein said casing has a base plate portion extending an entire width of said casing and dividing an inner portion of said casing into a chamber in which said electronic control unit is disposed and a chamber in which said electromagnetic-force generating portion is disposed and to which said electronic control unit is secured to an end thereof, said base plate portion comprising a holding portion directly supporting said yoke, said bobbin has a connection terminal to which an end of said wound solenoid is connected and which is made of conductive metal, said electronic control unit and said electromagnetic-force generating portion are electrically connected to each other by at least said connection terminal, and a transition permission portion is provided between the portion of said yoke and that of said bobbin opposite to each other in an axial direction of said sleeve so that said yoke is movable with respect to said bobbin in the axial direction of said sleeve; and an urging member configured for abutting contact with said yoke for urging said yoke toward said valve housing.

* * * * *